US012563425B2

(12) United States Patent
Kumar et al.

(10) Patent No.: US 12,563,425 B2
(45) Date of Patent: Feb. 24, 2026

(54) MONITORING AND UPDATING MACHINE LEARNING MODELS

(71) Applicant: QUALCOMM Incorporated, San Diego, CA (US)

(72) Inventors: Rajeev Kumar, San Diego, CA (US); Gavin Bernard Horn, La Jolla, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 601 days.

(21) Appl. No.: 17/956,200

(22) Filed: Sep. 29, 2022

(65) Prior Publication Data

US 2024/0114364 A1 Apr. 4, 2024

(51) Int. Cl.
*H04W 24/08* (2009.01)
*H04W 24/02* (2009.01)

(52) U.S. Cl.
CPC ........... *H04W 24/08* (2013.01); *H04W 24/02* (2013.01)

(58) Field of Classification Search
CPC ..... H04W 24/08; H04W 24/02; H04W 24/10; G06N 20/00; G06N 3/08
USPC .......................................................... 370/329
See application file for complete search history.

(56) References Cited

U.S. PATENT DOCUMENTS 11,468,383 B1 * 10/2022 Nair ........................ G06N 20/00
2014/0372344 A1 * 12/2014 Morris ..................... G06N 5/02 706/11
2019/0215730 A1 * 7/2019 Qiao ................. H04W 28/0268
2020/0382968 A1 12/2020 Gupta et al.
2021/0035021 A1 2/2021 Sasson et al.
2021/0049451 A1 * 2/2021 Wang ..................... H04W 24/02
2021/0182658 A1 * 6/2021 Wang ................ H04L 25/03165
2021/0390434 A1 12/2021 Bai et al.
2022/0167236 A1 * 5/2022 Melodia ................ H04W 28/24
2022/0374808 A1 * 11/2022 Robinson ......... G06Q 10/06316
2023/0276264 A1 * 8/2023 Soldati .............. H04W 36/0064 455/422.1
2024/0049003 A1 * 2/2024 Rydén ..................... H04W 8/24

FOREIGN PATENT DOCUMENTS

WO WO-2022235187 A1 * 11/2022

OTHER PUBLICATIONS

International Search Report and Written Opinion—PCT/US2023/072949—ISA/EPO—Feb. 12, 2024(2207541WO).

(Continued)

*Primary Examiner* — Mong-Thuy T Tran
(74) *Attorney, Agent, or Firm* — Holland & Hart LLP

(57) ABSTRACT

Methods, systems, and devices for wireless communications are described. The method may include a user equipment (UE) may receive a control signal indicating an event trigger for reporting a performance parameter associated with a machine learning model. Further, the UE may receive one or more signals indicating input data for monitoring a performance of the machine learning model by the UE. Upon detecting the event trigger, the UE may transmit a report comprising the performance parameter.

30 Claims, 23 Drawing Sheets

(56) References Cited

OTHER PUBLICATIONS

MCC Support: "Final Report of 3GPP TSG RAN WG1 #109-e v1.0.0 (Online meeting, May 9, 2022)", 3GPP TSG RAN WG1 Meeting #110-e, R1-2205701, 3rd Generation Partnership Project, Mobile Competence Centre, 650, Route Des Lucioles, F-06921 Sophia-Antipolis Cedex, France, vol. RAN WG1, No. Toulouse, Aug. 22, 2022-Aug. 26, 2022, Aug. 17, 2022, pp. 1-242, XP052273665, Section 9.2.

Partial International Search Report—PCT/US2023/072949—ISA/EPO—Dec. 22, 2023 (2207541WO).

* cited by examiner

Receive a control signal indicating an event trigger for reporting a performance parameter associated with a machine learning model — 1805

Receive one or more signals indicating input data for monitoring a performance of the machine learning model by the UE — 1810

Transmit a report comprising the performance parameter based at least in part on detecting the event trigger, wherein the performance parameter is based at least in part on monitoring the performance of the machine learning model and on a comparison between the input data and output data of the machine learning model — 1815

1800

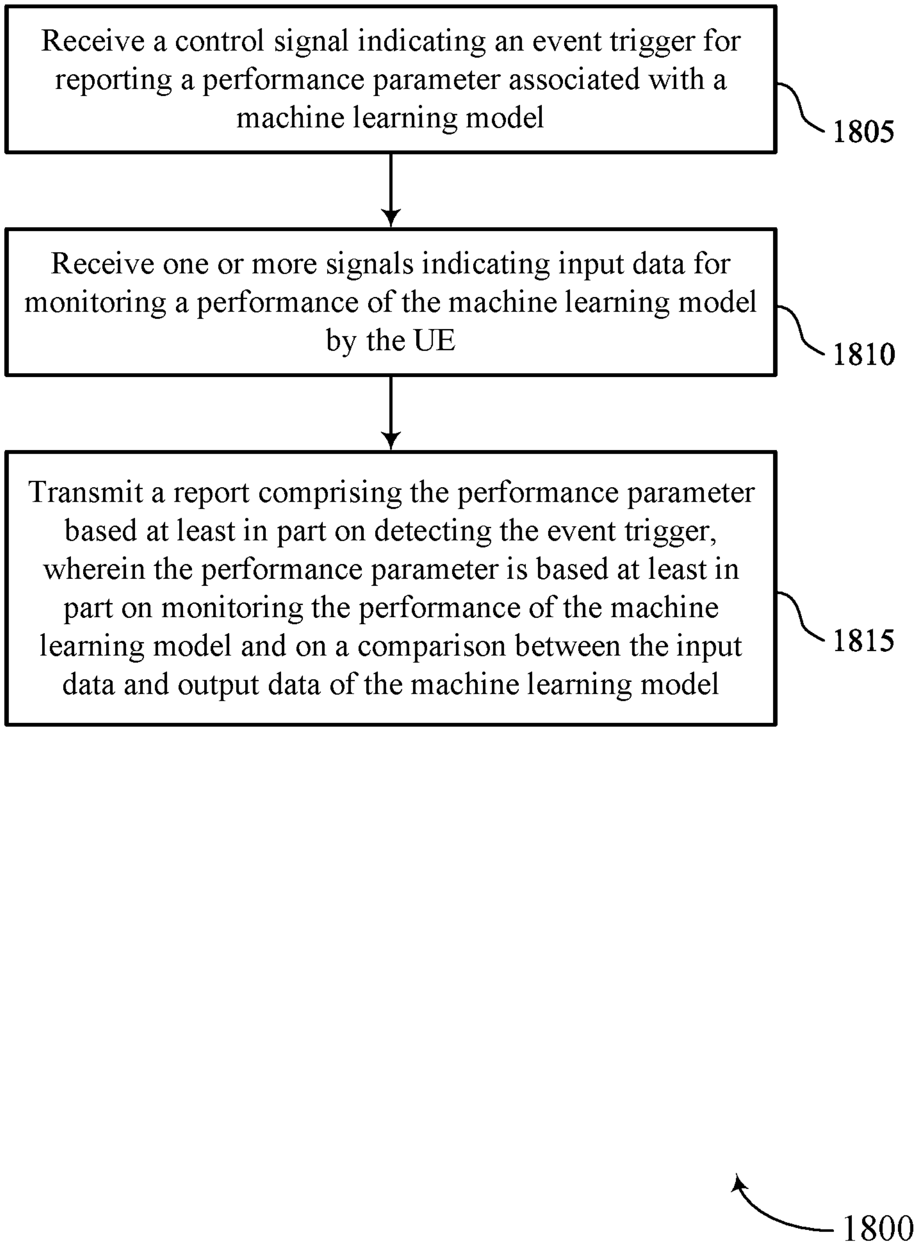

FIG. 18

Receive a control signal indicating an event trigger for reporting a performance parameter associated with a machine learning model ⟍ 1905

Receive one or more signals indicating input data for monitoring a performance of the machine learning model by the UE ⟍ 1910

Transmit a report comprising the performance parameter based at least in part on detecting the event trigger, wherein the performance parameter is based at least in part on monitoring the performance of the machine learning model and on a comparison between the input data and output data of the machine learning model ⟍ 1915

Receive a second control signal indicating one or more parameters associated with the machine learning model based at least in part on transmitting the report ⟍ 1920

Update the machine learning model based at least in part on the one or more parameters associated with the machine learning model ⟍ 1925

⟍ 1900

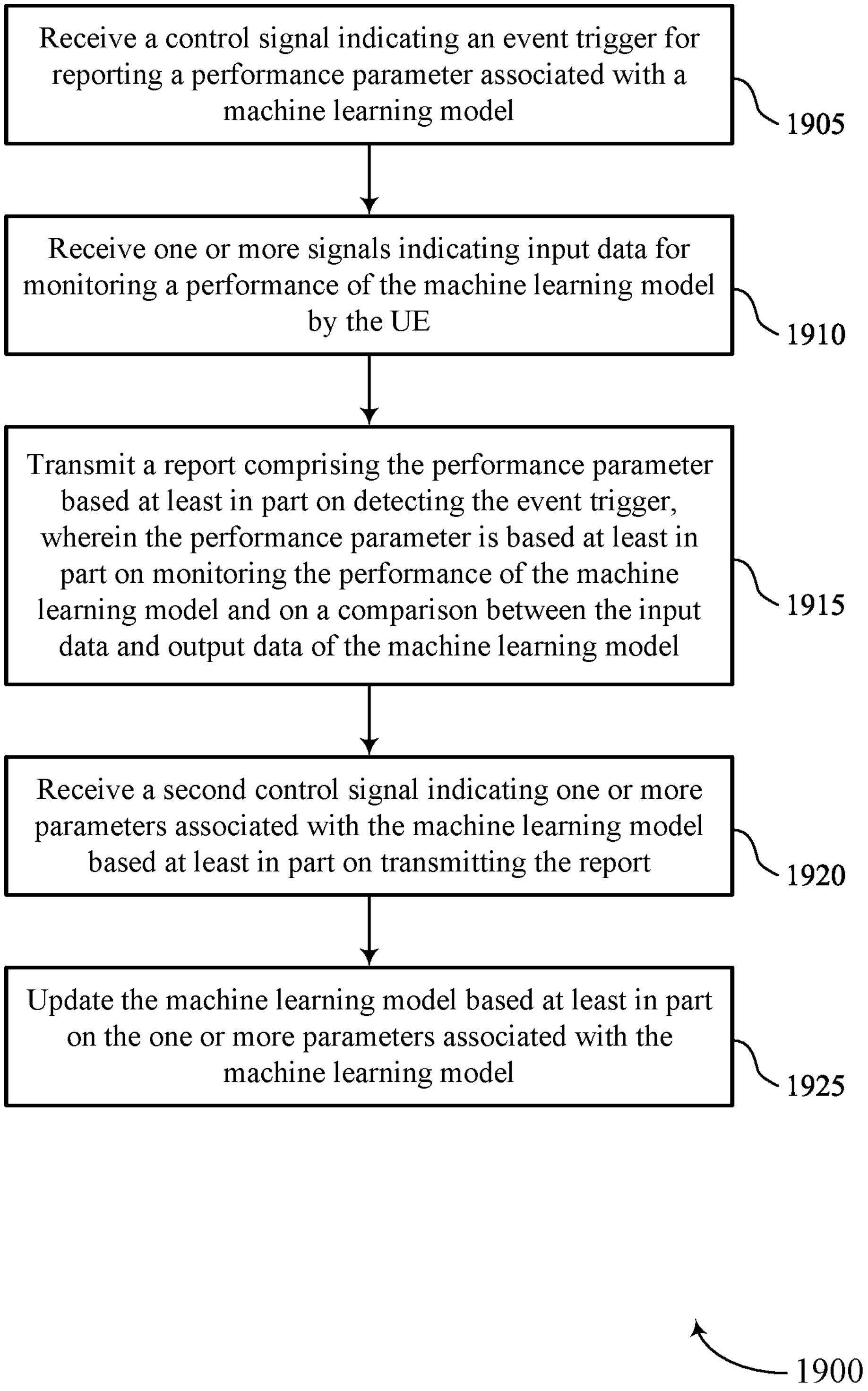

FIG. 19

Transmit a control signal indicating an event trigger for reporting a performance parameter associated with a machine learning model

2005

Transmit one or more signals indicating input data for monitoring a performance of the machine learning model by a UE

2010

Receive a report comprising the performance parameter, wherein the performance parameter is based at least in part on a comparison between the input data and output data of the machine learning model

2015

2000

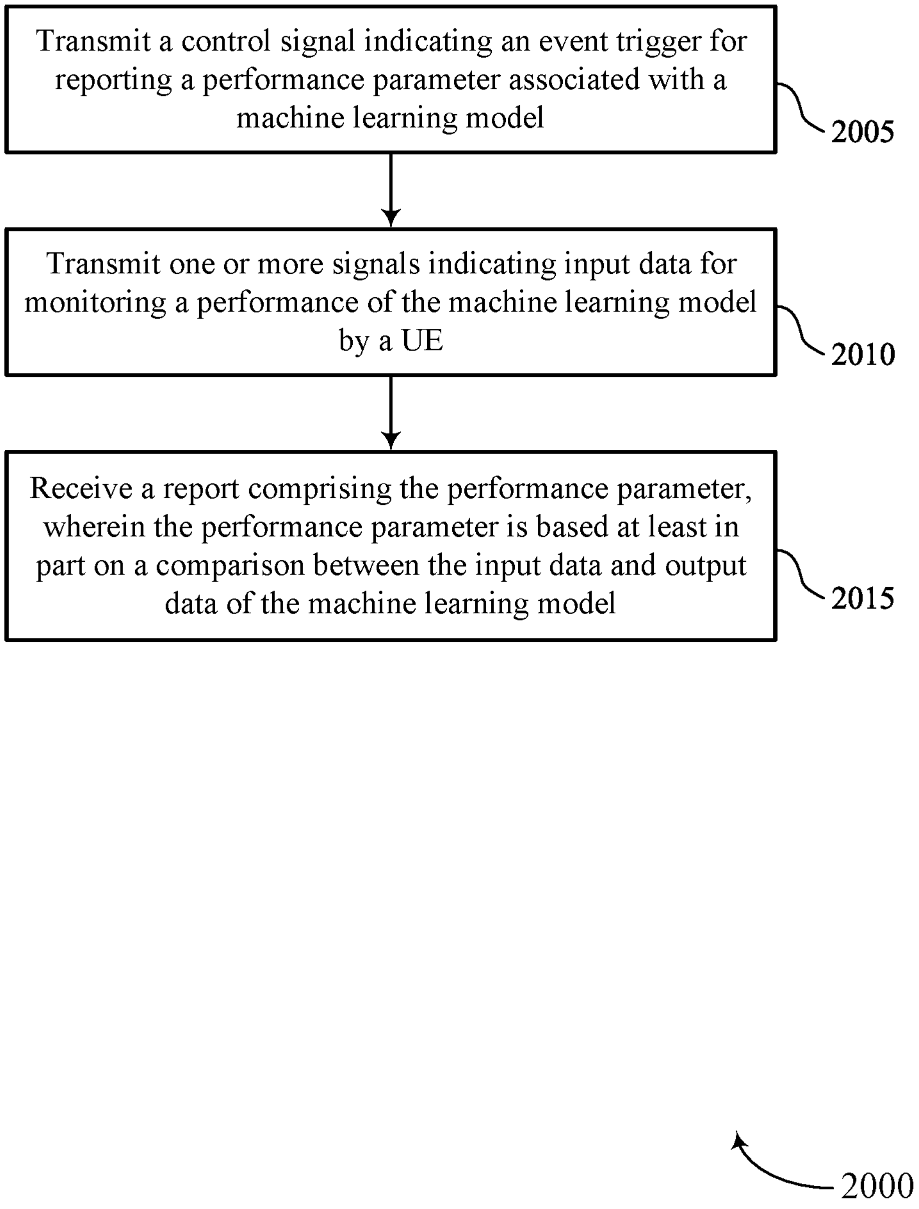

FIG. 20

Transmit a control signal indicating an event trigger for reporting a performance parameter associated with a machine learning model

2105

Transmit one or more signals indicating input data for monitoring a performance of the machine learning model by a UE

2110

Receive a report comprising the performance parameter, wherein the performance parameter is based at least in part on a comparison between the input data and output data of the machine learning model

2115

Transmit a second control signal indicating one or more parameters associated with the machine learning model based at least in part on receiving the report

2120

2100

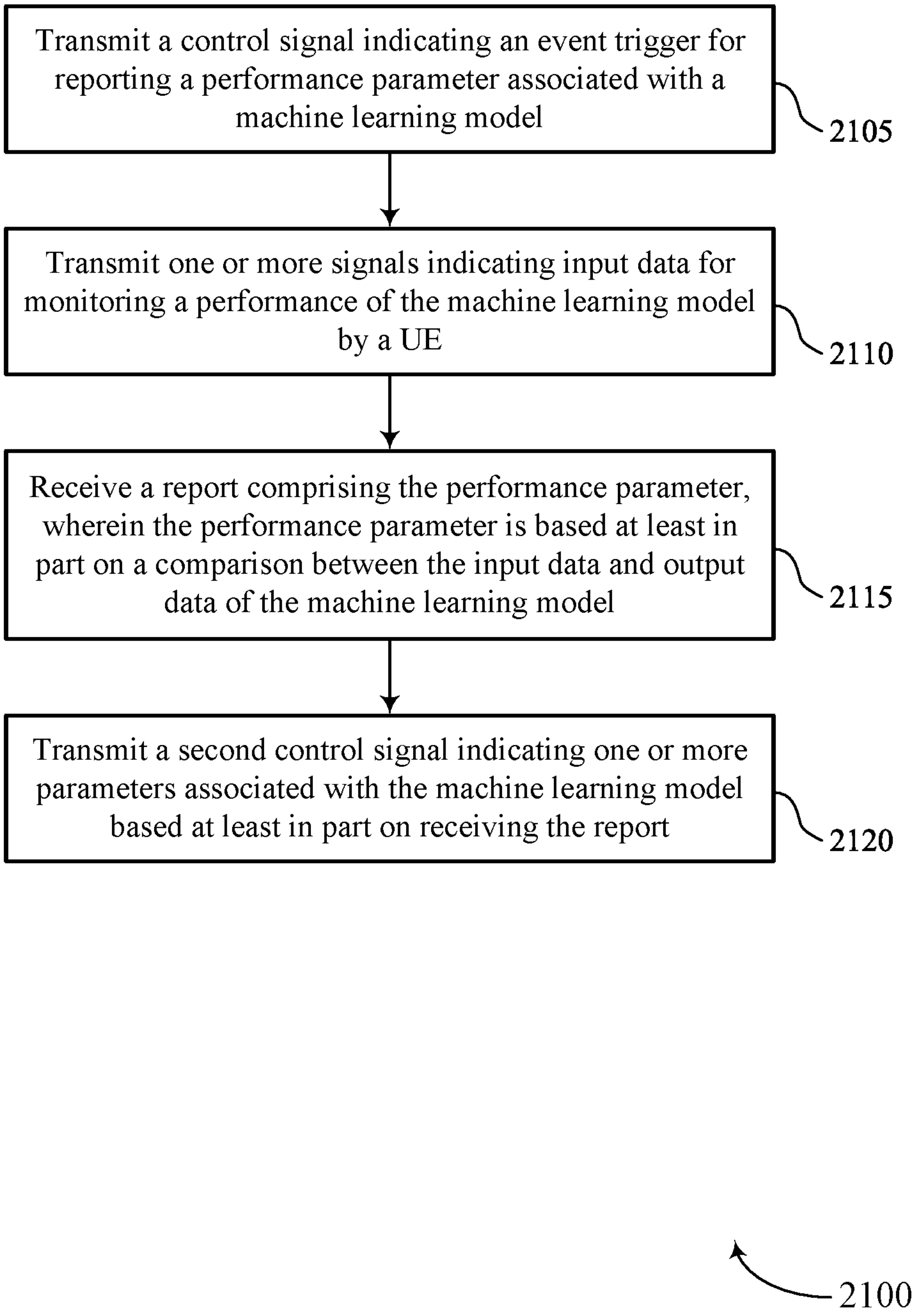

FIG. 21

Receive a first control signal indicating input data for monitoring a performance of a machine learning model by the node

2205

Generate a performance parameter associated with the machine learning model based at least in part on detecting an event trigger, wherein the performance parameter is based at least in part on a comparison between the input data and output data of the machine learning model

2210

Transmit a second control signal configuring a UE with a second machine learning model or activating the second machine learning model based at least in part on the performance parameter

2215

2200

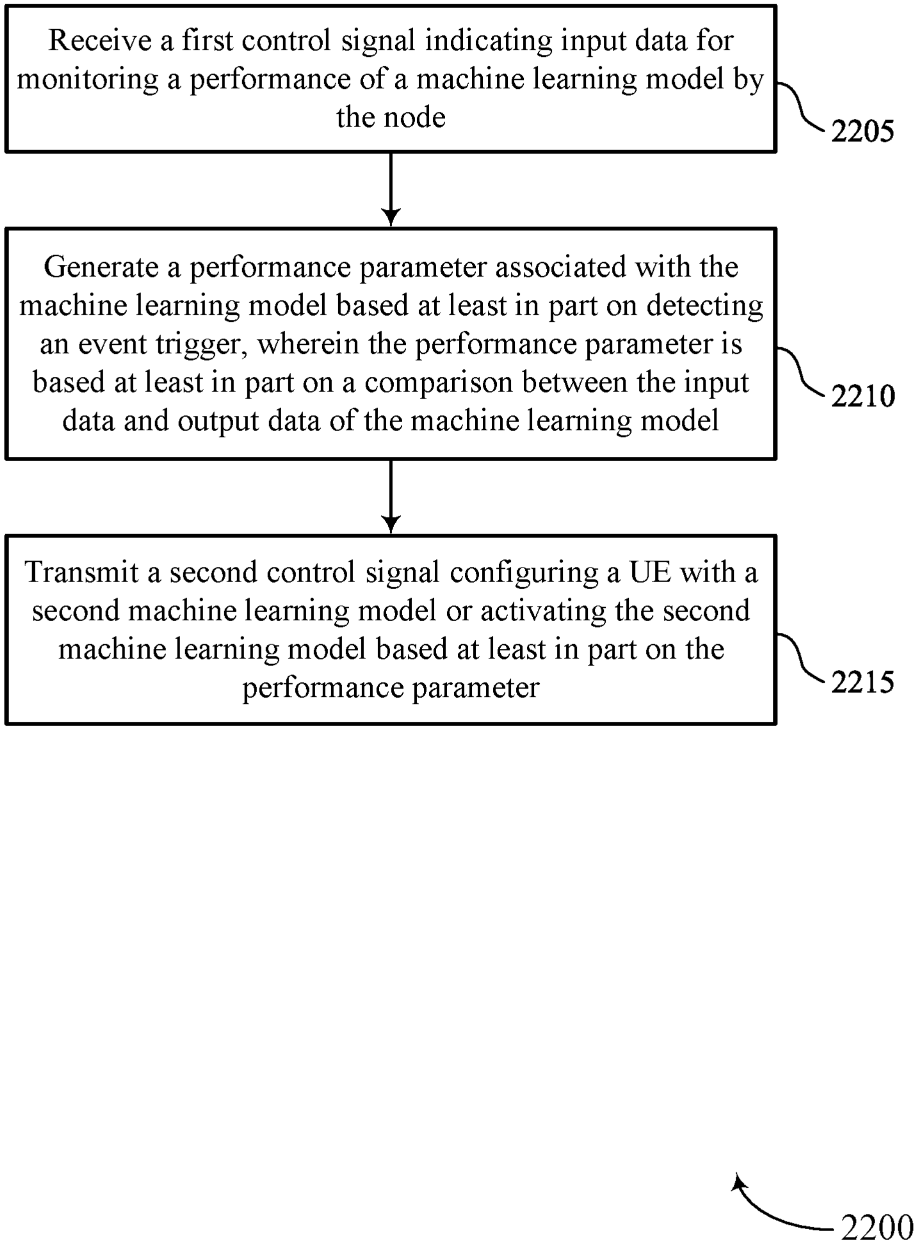

FIG. 22

MONITORING AND UPDATING MACHINE LEARNING MODELS

FIELD OF TECHNOLOGY

The following relates to wireless communications, including monitoring and updating machine learning models.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a wireless communications system may implement a machine learning model. Machine learning may be described as a branch of artificial intelligence that provides systems the ability to improve and learn from experience. In order to implement machine learning, devices of the wireless communications system (e.g., a network entity or a UE) may use a machine learning model for wireless communications.

SUMMARY

The described techniques relate to improved methods, systems, devices, and apparatuses that support monitoring and updating machine learning models. For example, the described techniques enable devices of a network to monitor a performance of a machine learning model implemented at the devices. In some examples, a user equipment (UE) may receive a control signal from a network entity or a server. The control signal may indicate an event trigger for reporting a performance parameter associated with a machine learning model. Upon receiving the control signal, the UE may receive one or more signals indicating input data for monitoring a performance of the machine learning model by the UE (e.g., ground truth for the machine learning model). When the UE detects the event trigger, the UE may transmit a report including the performance parameter. The UE may determine the performance parameters based on a comparison of the input data and data output from the machine learning model. Upon receiving the report, the network entity or the server may exchange signaling with the UE to update the machine learning model. Such techniques may enable efficient monitoring and reporting of a machine learning model performance.

A method for wireless communications at a UE is described. The method may include receiving a control signal indicating an event trigger for reporting a performance parameter associated with a machine learning model, receiving one or more signals indicating input data for monitoring a performance of the machine learning model by the UE, and transmitting a report including the performance parameter based on detecting the event trigger, where the performance parameter is based on monitoring the performance of the machine learning model and on a comparison between the input data and output data of the machine learning model.

An apparatus for wireless communications at a UE is described. The apparatus may include a processor, memory coupled with the processor, and instructions stored in the memory. The instructions may be executable by the processor to cause the apparatus to receive a control signal indicating an event trigger for reporting a performance parameter associated with a machine learning model, receive one or more signals indicating input data for monitoring a performance of the machine learning model by the UE, and transmit a report including the performance parameter based on detecting the event trigger, where the performance parameter is based on monitoring the performance of the machine learning model and on a comparison between the input data and output data of the machine learning model.

Another apparatus for wireless communications at a UE is described. The apparatus may include means for receiving a control signal indicating an event trigger for reporting a performance parameter associated with a machine learning model, means for receiving one or more signals indicating input data for monitoring a performance of the machine learning model by the UE, and means for transmitting a report including the performance parameter based on detecting the event trigger, where the performance parameter is based on monitoring the performance of the machine learning model and on a comparison between the input data and output data of the machine learning model.

A non-transitory computer-readable medium storing code for wireless communications at a UE is described. The code may include instructions executable by a processor to receive a control signal indicating an event trigger for reporting a performance parameter associated with a machine learning model, receive one or more signals indicating input data for monitoring a performance of the machine learning model by the UE, and transmit a report including the performance parameter based on detecting the event trigger, where the performance parameter is based on monitoring the performance of the machine learning model and on a comparison between the input data and output data of the machine learning model.

A method for wireless communications at a node is described. The method may include transmitting a control signal indicating an event trigger for reporting a performance parameter associated with a machine learning model, transmitting one or more signals indicating input data for monitoring a performance of the machine learning model by a UE, and receiving a report including the performance parameter, where the performance parameter is based on a comparison between the input data and output data of the machine learning model.

An apparatus for wireless communications at a node is described. The apparatus may include a processor, memory coupled with the processor, and instructions stored in the memory. The instructions may be executable by the processor to cause the apparatus to transmit a control signal indicating an event trigger for reporting a performance parameter associated with a machine learning model, transmit one or more signals indicating input data for monitoring a performance of the machine learning model by a UE, and receive a report including the performance parameter, where the performance parameter is based on a comparison between the input data and output data of the machine learning model.

Another apparatus for wireless communications at a node is described. The apparatus may include means for transmitting a control signal indicating an event trigger for reporting a performance parameter associated with a machine learning model, means for transmitting one or more signals indicating input data for monitoring a performance of the machine learning model by a UE, and means for receiving a report including the performance parameter, where the performance parameter is based on a comparison between the input data and output data of the machine learning model.

A non-transitory computer-readable medium storing code for wireless communications at a node is described. The code may include instructions executable by a processor to transmit a control signal indicating an event trigger for reporting a performance parameter associated with a machine learning model, transmit one or more signals indicating input data for monitoring a performance of the machine learning model by a UE, and receive a report including the performance parameter, where the performance parameter is based on a comparison between the input data and output data of the machine learning model.

A method for wireless communication at a node is described. The method may include receiving a first control signal indicating input data for monitoring a performance of a machine learning model by the node, generating a performance parameter associated with the machine learning model based on detecting an event trigger, where the performance parameter is based on a comparison between the input data and output data of the machine learning model, and transmitting a second control signal configuring a UE with a second machine learning model or activating the second machine learning model based on the performance parameter.

An apparatus for wireless communication at a node is described. The apparatus may include a processor, memory coupled with the processor, and instructions stored in the memory. The instructions may be executable by the processor to cause the apparatus to receive a first control signal indicating input data for monitoring a performance of a machine learning model by the node, generate a performance parameter associated with the machine learning model based on detecting an event trigger, where the performance parameter is based on a comparison between the input data and output data of the machine learning model, and transmit a second control signal configuring a UE with a second machine learning model or activating the second machine learning model based on the performance parameter.

Another apparatus for wireless communication at a node is described. The apparatus may include means for receiving a first control signal indicating input data for monitoring a performance of a machine learning model by the node, means for generating a performance parameter associated with the machine learning model based on detecting an event trigger, where the performance parameter is based on a comparison between the input data and output data of the machine learning model, and means for transmitting a second control signal configuring a UE with a second machine learning model or activating the second machine learning model based on the performance parameter.

A non-transitory computer-readable medium storing code for wireless communication at a node is described. The code may include instructions executable by a processor to receive a first control signal indicating input data for monitoring a performance of a machine learning model by the node, generate a performance parameter associated with the machine learning model based on detecting an event trigger, where the performance parameter is based on a comparison between the input data and output data of the machine learning model, and transmit a second control signal configuring a UE with a second machine learning model or activating the second machine learning model based on the performance parameter.

BRIEF DESCRIPTION OF THE DRAWINGS

FIGS. 18 through 23 show flowcharts illustrating methods that support monitoring and updating machine learning models in accordance with one or more aspects of the present disclosure.

DETAILED DESCRIPTION

In some examples, a device (e.g., a user equipment (UE)) may utilize machine learning for one or more wireless communication procedures. As the UE performs the one or more wireless communication procedures, changes or updates may be made to a machine learning model to enhance the performance of the machine learning model. For example, a new machine learning model may be selected or a machine learning model may be updated. In some examples, the device may change or update the machine learning model if the model or system performance degrades. To determine whether the model or system performance degrades, the device may monitor performance and key performance indicators (KPI) corresponding to the machine learning model. A signaling scheme for reporting the KPIs (e.g., to a network entity) has yet to be realized.

As described herein, a device (e.g., a UE) may report a performance parameter (e.g., a KPI) to a node (e.g., a network entity or a third party server) based on an event trigger. In some examples, the UE may receive a control signal indicating the event trigger for reporting the performance parameter associated with a machine learning model. The event trigger may include a settings changes, a location or environment change, or a service change at the UE or the node. Further, the UE may receive a signal indicating monitoring input data associated with the machine learning model. The monitoring input data may include metadata (e.g., thresholds associated with the performance parameter) or ground truth for the machine learning model. The UE may monitor the performance parameter using outputs of the machine learning model and the monitoring input data and report the performance parameter to the node upon detecting the event trigger. The node may receive the report and based on the performance parameter, transmit signaling to the UE indicating for the UE to activate a new machine model or update one or more parameters associated with the machine learning model. Further, the node may forward the report to a second node (e.g., for handover preparation). Similar procedures may be implemented for network side machine learning model monitoring.

Aspects of the disclosure are initially described in the context of wireless communications systems. Additional aspects are described in the context of process flows. Aspects of the disclosure are further illustrated by and described with reference to apparatus diagrams, system diagrams, and flowcharts that relate to monitoring and updating machine learning models.

Figure 1:
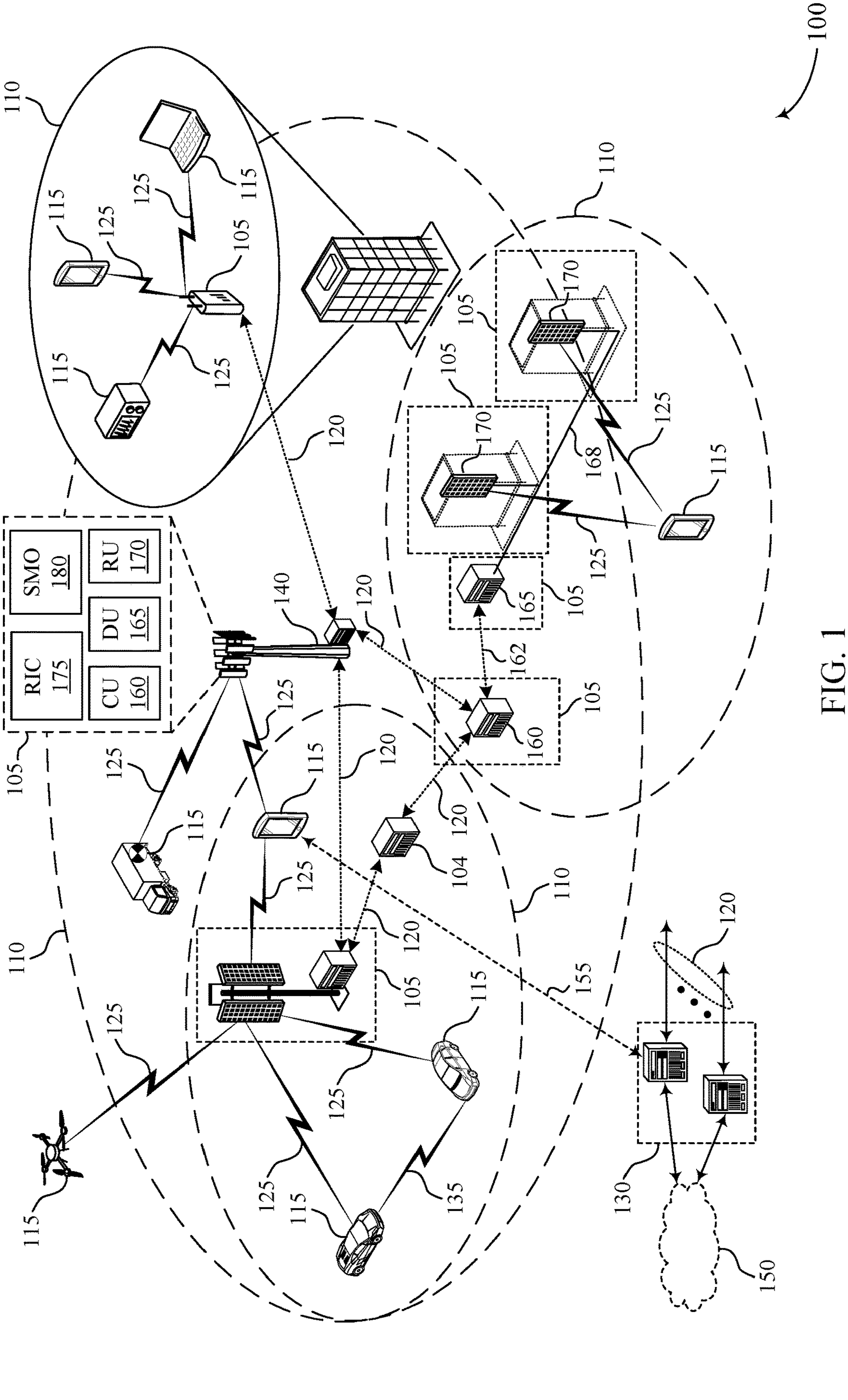
FIG. 1 illustrates an example of a wireless communications system that supports monitoring and updating machine learning models in accordance with one or more aspects of the present disclosure.

FIG. 1 illustrates an example of a wireless communications system 100 that supports monitoring and updating machine learning models in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support monitoring and updating machine learning models as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As described herein, a device (e.g., a UE 115 or a network entity 105) may monitor the performance of a machine learning model implemented at the device. In some examples, the UE 115 may receive a control signal from a network entity 105 or a server. The control signal may indicate an event trigger for reporting a performance parameter associated with a machine learning model. Upon receiving the control signal, the UE 115 may receive one or more signals indicating input data for monitoring a performance of the machine learning model by the UE 115 (e.g., ground truth for the machine learning model). When the UE 115 detects the event trigger, the UE 115 may transmit a report including the performance parameter. The UE 115 may determine the performance parameters based on a comparison of the input data and data output from the machine learning model. Upon receiving the report, the network entity 105 or the server may exchange signaling with the UE 115 to update the machine learning model.

Figure 2:
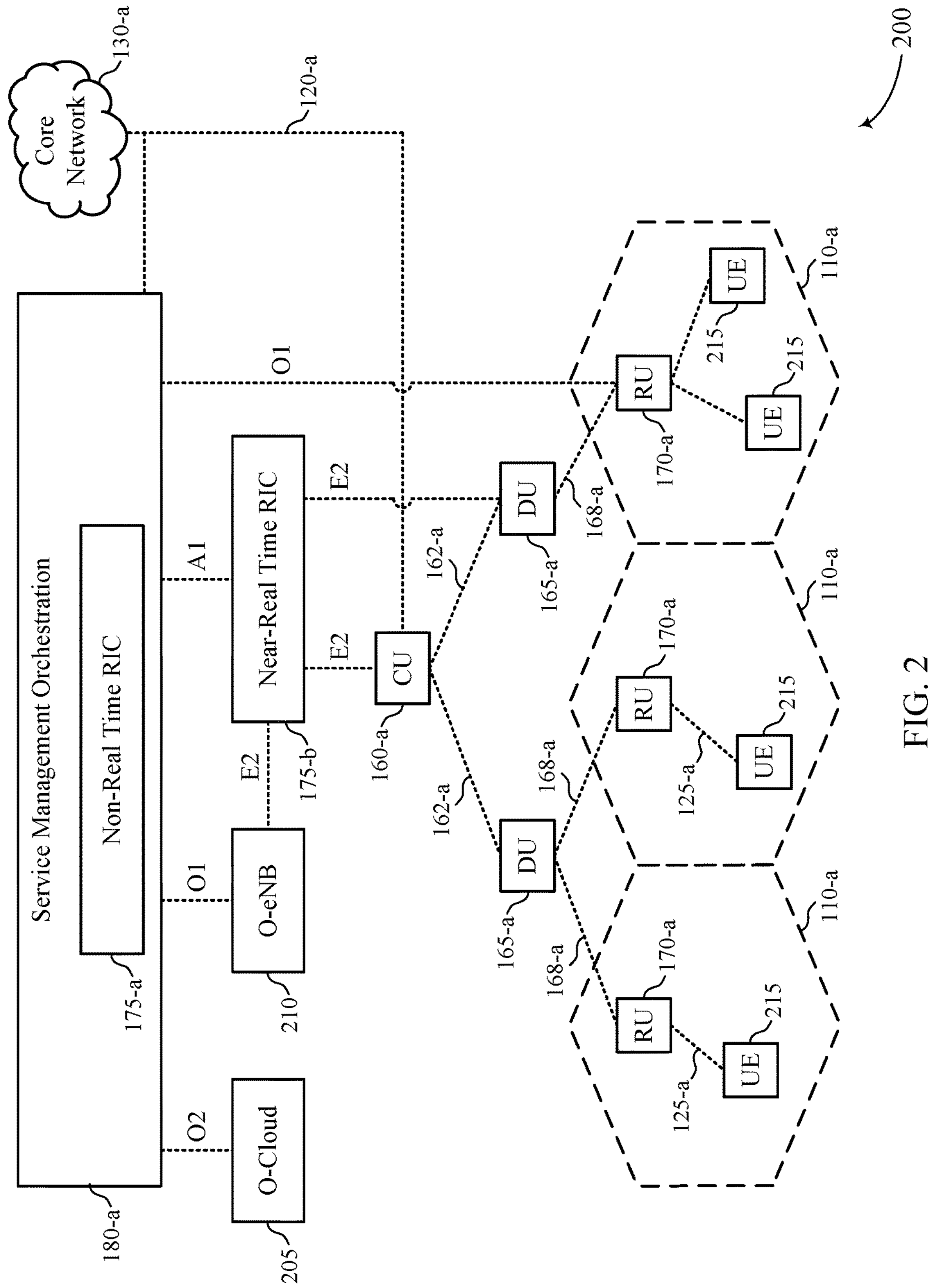
FIG. 2 illustrates an example of a network architecture that supports monitoring and updating machine learning models in accordance with one or more aspects of the present disclosure.

FIG. 2 illustrates an example of a network architecture 200 (e.g., a disaggregated base station architecture, a disaggregated RAN architecture) that supports monitoring and updating machine learning models in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 215 via one or more communication links 125-*a*. In some implementations, a UE 215 may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules or components for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 215. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT MC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

As described herein, a device (e.g., a UE 215) may monitor the performance of a machine learning model implemented at the device. In some examples, the UE 215 may receive a control signal from a network entity (e.g., a CU 160 or a DU 165) or a server. The control signal may indicate an event trigger for reporting a performance parameter associated with a machine learning model. Upon receiving the control signal, the UE 215 may receive one or more signals indicating input data for monitoring a performance of the machine learning model by the UE 215 (e.g., ground truth for the machine learning model). When the UE 215 detects the event trigger, the UE 215 may transmit a report including the performance parameter. The UE 215 may determine the performance parameters based on a comparison of the input data and data output from the machine learning model. Upon receiving the report, the network entity (e.g., a CU 160 or DU 165) or the server may exchange signaling with the UE 215 to update the machine learning model.

Figure 3:
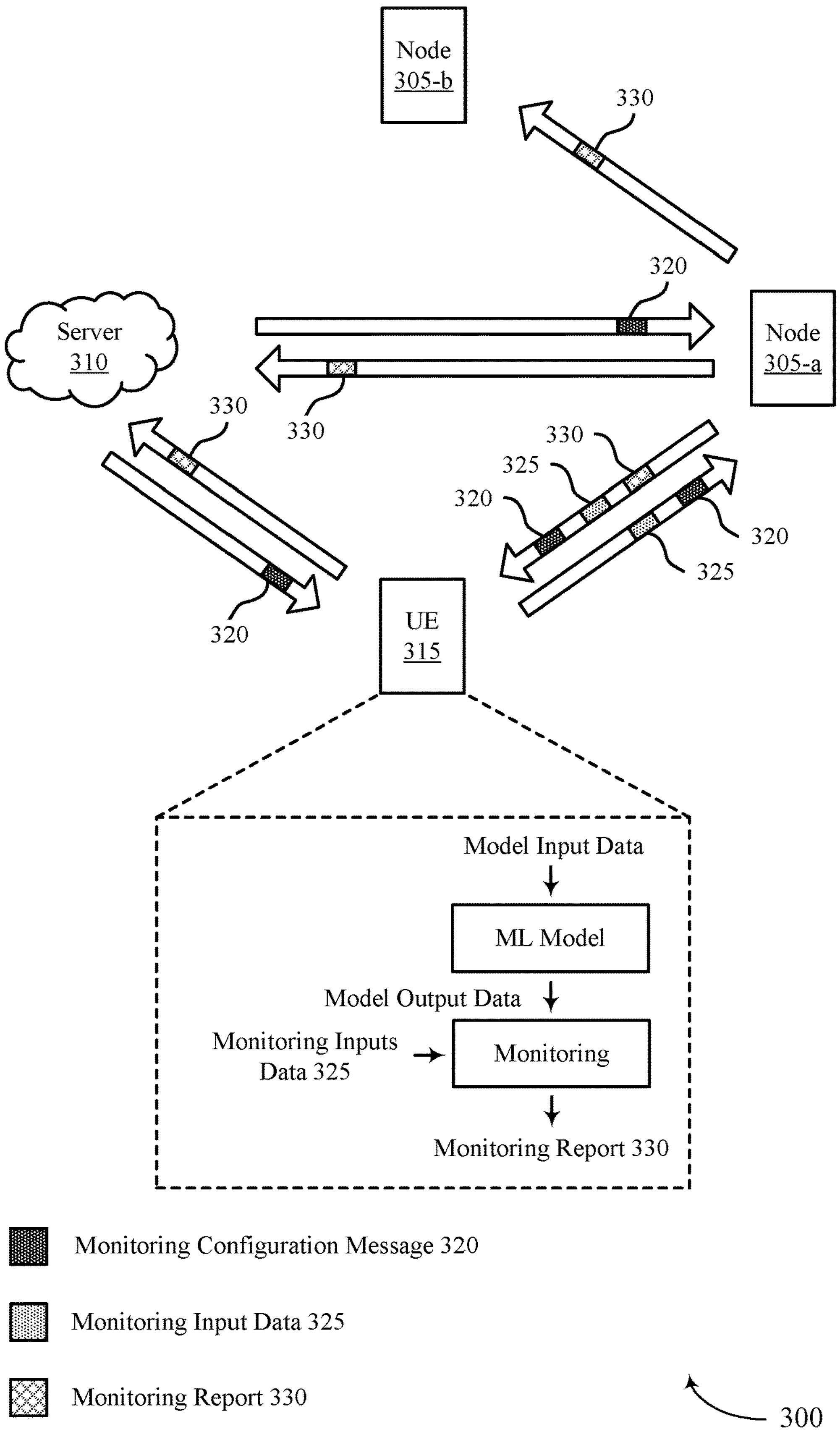
FIG. 3 illustrates an example of a wireless communications system that supports monitoring and updating machine learning models in accordance with one or more aspects of the present disclosure.

FIG. 3 illustrates an example of a wireless communications system 300 that supports monitoring and updating machine learning models in accordance with one or more aspects of the present disclosure. In some examples, the wireless communications system 300 may implements aspects of a wireless communications system 100 and a network architecture 200. For example, the wireless communications system 300 may include a UE 315 which may be an example of a UE 115 as described with reference to FIG. 1 or a UE 215 as described with reference to FIG. 2. Further, the wireless communications system 300 may include a node 305-*a* which may be an example of a network entity 105 as described with reference to FIG. 1 or a CU 160 as described with reference to FIG. 2. Moreover, the wireless communications system 300 may include a node 305-*b* which may be an example of a network entity 105 as described with reference to FIG. 1 or a DU 165 as described with reference to FIG. 2.

In some examples, the UE 315 may implement machine learning to perform one or more wireless communication procedures. Machine learning may be described as a series of algorithms that automatically improve through experience. The UE 315 may utilize machine learning to detect delays related to line-of-sight (LOS) signals, to perform beam management, to perform cell selection, to perform cell reselection, etc. In order to implement machine learning, the UE 315 may obtain a machine learning model and a machine learning function. The machine learning function may be defined as a function supported by one or more machine learning models and may be specific to the task being performed and the machine learning model may be defined by a model structure (e.g., a number of nodes or a number of layers of the machine learning model) and a parameter set (e.g., weights of the machine learning model and other configuration parameters). In some examples, the machine learning models may be categorized based on functionality using a machine learning feature name (MLFN). Machine learning models associated with a MLFN may be identified using a machine learning model ID or a model structure ID (MS ID). The machine learning ID may indicate the machine learning model whereas the MS ID may indicate the machine learning model as well as the corresponding parameter set via a parameter set ID (PS ID). In some examples, the model ID or the MS ID may be unique for each MLFN (e.g., to identify separate models for each third party vendor).

In some examples, a machine learning model implemented at the UE 315 may change over time. For example, the UE 315 may receive a new machine learning model or refine the current machine learning model. In some examples, a change to the machine learning model may occur if a performance of the model degrades, a performance of the system degrades, or if the machine learning model criteria (e.g., model structure or parameter set) is invalid. As such, in order to determine whether a change to the machine learning model is favorable, the UE 315 may monitor the machine learning model.

In some examples, the UE 315 may monitor a performance of the machine learning model. In such example, the UE 315 may receive a monitoring configuration message 320 that includes an indication of an event trigger for reporting a performance parameter. In one example, the UE 315 may receive the monitoring configuration message 320 from the node 305-*a* which may be an example of a network entity as described herein. Alternatively, in some examples, the node 305-*a* may receive the monitoring configuration message 320 from the server 310 and relay the monitoring configuration message 320 to the UE 315. Alternatively, the UE 315 may receive the monitoring configuration message 320 from the server 310. In some examples, the server 310 may be an example of an edge cloud, a UE-model repository (UE-MR), a third party server, or the like.

The event trigger may include a settings change at the UE 315. For example, the event trigger may include a change to a number of antenna the UE 315 uses to communicate with the node 305-*a* or a change to active component carriers the UE 315 uses to communicate with the node 305-*a*. Alternatively or additionally, the event trigger may include a change in the environment of the UE 315. For example, the event trigger may include the UE 315 moving from an indoor environment to an outdoor environment, the UE 315 moving from the outdoor environment to the indoor environment, a change to an orientation of the UE 315, or a change in a velocity of the UE 315. Alternatively or additionally, the event trigger may include a service change at the UE 315. For example, the event trigger may include a change to network slicing, a change to a quality of service (QoS) flow, or a change in session. Alternatively or additionally, the event trigger may include the performance parameter satisfying a threshold. For example, the event trigger may include a KPI falling below a threshold.

Further, the UE 315 may receive monitoring input data 325 from the node 305-*a*. In some examples, the UE 315 may receive the monitoring input data 325 according to a periodicity. That is, the UE 315 may periodically receive the monitoring input data 325 from the node 305-*a*. In some examples, the monitoring input data 325 may include ground truth for the machine learning model or meta-data. An example of the metadata may be the threshold for the performance parameter. Upon receiving the monitoring input data 325, the UE 315 may monitor the performance of the machine learning model. In some examples, the UE 315 may apply model input data to the machine learning model and generate model output data. The UE 315 may perform the monitoring on the model output data using the monitoring input data 325 and generate the performance parameter. In one example, the UE 315 may generate one or more KPIs, such as system KPIs. A system KPI may include network loading, uplink and downlink throughout, delay packet loss, or radio link failures (RLFs). In another example, the UE 315 may generate one or more performance KPIs. A performance KPI may include an MMSE error threshold compared to ground truth or interference latency (e.g., how long it takes for the machine learning model to generate the model output data).

In some examples, while monitoring the machine learning model, the UE 315 may detect the event trigger. As one example, the UE 315 may determine the KPI falls below the threshold. In response to detecting the event trigger, the UE 315 may transmit a monitoring report 330 including the performance parameter. In one example, the UE 315 may transmit the monitoring report to the node 305-*a*. In some examples, in response to receiving the monitoring report 330 from the UE 315, the node 305-*a* may forward the monitoring report to one or both of the node 305-*b* or the server 310. In some examples, the node 305-*b* may be an example of a network entity (e.g., a neighboring network entity to the node 305-*a*). In another example, the node 305-*a* and the node 305-*b* may be an example of a distributed base station, where the node 305-*a* is a CU of the distributed base station and the node 305-*b* is a DU of the distributed base station. In another example, the UE 315 may transmit the monitoring report directly to the server 310.

Upon receiving the monitoring report 330, the server 310 or the node 305-*a* may determine whether to update the machine learning model at the UE 315 using the performance parameters included in the monitoring report 330. If the server 310 or the node 305-*a* determines to update the machine learning model at the UE 315, the server 310 or the node 305-*a* may exchange signaling with the UE 315 to update the machine learning model. In some example, updating the machine learning model may include configuring or activating the UE 315 a second machine learning model or deactivating the machine learning model. In another example, the updating the machine learning model may include refining the machine learning model (e.g., by providing the UE 315 with a new parameter set).

In another example, the node 305-*a* may monitor a performance of the machine learning model. In such example, the node 305-*a* may, in some cases, transmit a monitoring configuration message 320 that includes an indication for the UE 315 to transmit monitoring input data 325 to the node 305-*a*. Alternatively, the node 305-*a* may receive the monitoring configuration message 320 from one of the UE 315 or the server 310, where the monitoring configuration message 320 includes an indication of an event trigger for generating a performance parameter.

The event trigger may include a settings change at the UE 315 or the node 305-*a*. For example, the event trigger may include a change to a number of antenna the UE 315 uses to communicate with the node 305-*a* or a change to active component carriers the UE 315 uses to communicate with the node 305-*a*. Additionally, or alternatively, the event trigger may include a change in the environment of the UE 315. For example, the event trigger may include the UE 315 moving from an indoor environment to an outdoor environment, the UE 315 moving from the outdoor environment to the indoor environment, a change to an orientation of the UE 315, or a change in a velocity of the UE 315. Alternatively or additionally, the event trigger may include a service change at the UE 315. For example, the event trigger may include a change to network slicing, a change to a QoS flow, or a change in session. Alternatively or additionally, the event trigger may include the performance parameter satisfying a threshold. For example, the event trigger may include a KPI falling below a threshold.

Further, the node 305-*a* may receive monitoring input data 325 from the UE 315. In some examples, the node 305-*a* may receive the monitoring input data 325 according to a periodicity. That is, the node 305-*a* may periodically receive the monitoring input data 325 from the UE 315. In some examples, the monitoring input data 325 may include ground truth for the machine learning or metadata. An example of the metadata may be the threshold for the performance parameter. Upon receiving the monitoring input data 325, the node 305-*a* may monitor the performance of the machine learning model. In some examples, the node 305-*a* may apply model input data to the machine learning model and generate model output data. The node 305-*a* may perform the monitoring on the model output data using the monitoring input data 325 and generate the performance parameter. In one example, the node 305-*a* may generate one or more system KPIs. A system KPI may include network loading, uplink and downlink throughout, delay packet loss, or RLFs. In another example, the node 305-*a* may generate one or more performance KPIs. A performance KPI may include an MMSE error threshold compared to ground truth or interference latency (e.g., how long it takes for the machine learning model to generate the model output data).

In some examples, while monitoring the machine learning model, the node 305-*a* may detect the event trigger. As one example, the node 305-*a* may determine the KPI falls below the threshold. In response to detecting the event trigger, the node 305-*a* may potentially transmit a monitoring report 330 including the performance parameter to the node 305-*b* or the server 310. Additionally or alternatively, upon detecting the event trigger, the node 305-*a* may determine whether to update the machine learning model at the UE 315 using the generated performance parameter. If the node 305-*a* determines to update the machine learning model at the UE 315, the node 305-*a* may exchange signaling with the UE 315 to update the machine learning model. In some example, updating the machine learning model may include activating or configuring the UE 315 with a second machine learning model or deactivating the machine learning model.

Figure 4:
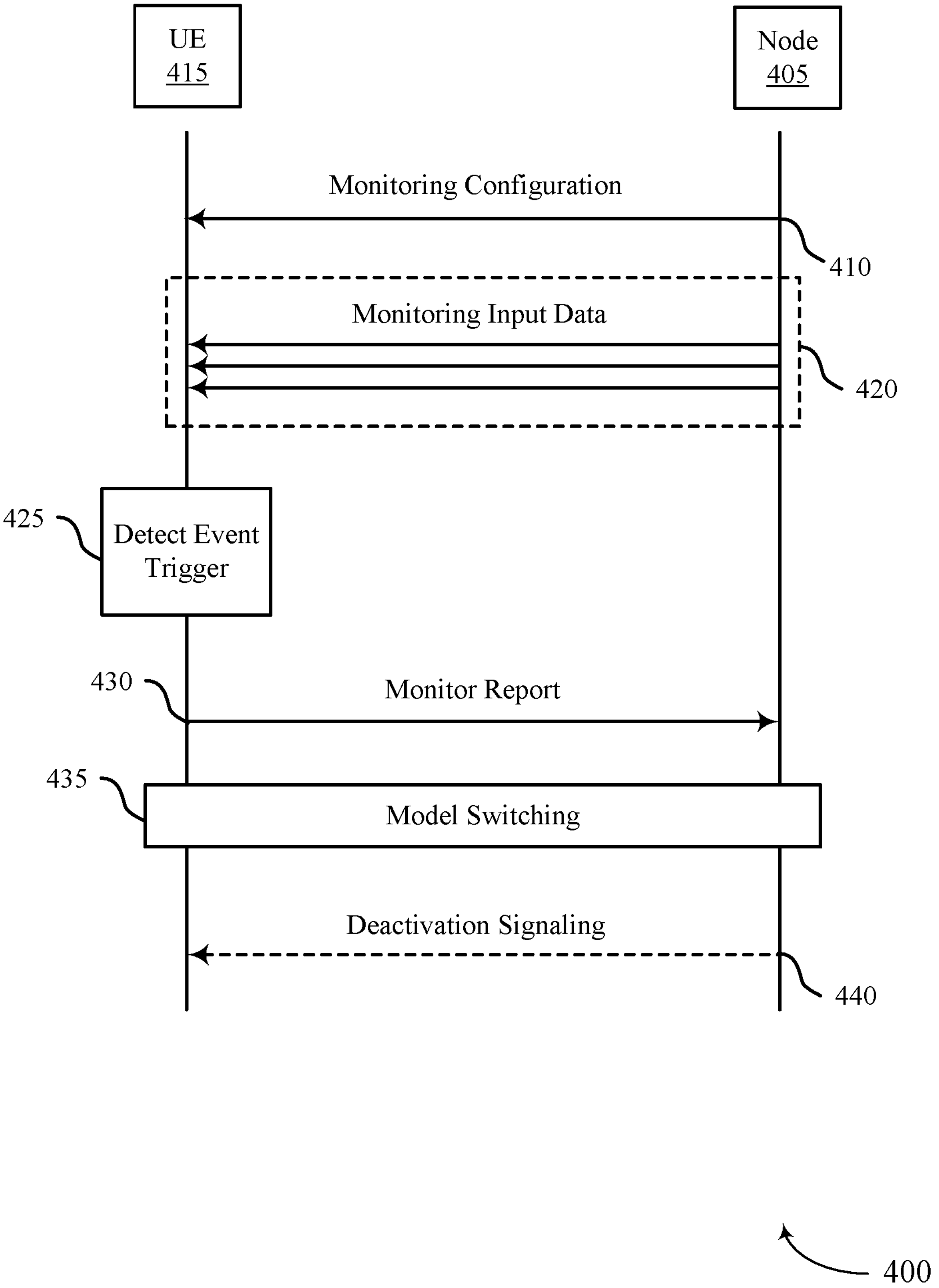
FIG. 4 through 9 illustrate examples of a process flow that supports monitoring and updating machine learning models in accordance with one or more aspects of the present disclosure.

FIG. 4 illustrates an example of a process flow 400 that supports monitoring and updating machine learning models in accordance with one or more aspects of the present disclosure. In some examples, the process flow 400 may be implemented by a UE 415 and anode 405. The UE 415 may be an example of a UE 115, a UE 215, ora UE 315 as described with reference to FIGS. 1 through 3, respectively. The node 405 may be an example of a network entity 105, a CU 160, or a node 305-*a* as described with reference to FIGS. 1 through 3, respectively. Alternative examples of the following may be implemented, where steps are performed in a different order than described or are not performed at all. In some cases, steps may include additional features not mentioned below or further features may be added.

At 410, the UE 415 may receive a control signal including a monitoring configuration from the node 405. In some examples, the monitoring configuration may indicate an event trigger for reporting one or more performance parameters associated with a machine learning model. The event trigger may include a settings change (e.g., a change in a number of antennas the UE 415 uses to communicate with the node 405), a location change (e.g., the UE 415 moving from an indoor environment to an outdoor environment), a service change (e.g., a change in a QoS flow utilized by the UE 415), or one or more performance parameters associated with a machine learning model satisfying a threshold (e.g., falling below a threshold). Further, the monitoring configuration may include a list of the one or more performance parameters to report. For example, the monitoring configuration may include a list of one or more types of performance KPIs (e.g., interference latency) or system KPIs (e.g., network loading). In some examples, the control signaling may be an example of an RRC configuration message. Further, in some examples, upon receiving the control signal, the UE 415 may transmit a signal to the node 405 indicating that the UE 415 successfully received and implemented the control signal (e.g., an RRC configuration complete message).

At 420, the UE 415 may receive one or more signals including monitoring input data from the node 405. In some examples, the monitoring input data may include one or both of ground truth for evaluating the one or more performance parameters (e.g., performance or system KPIs) or metadata for evaluating a model switching condition (e.g., the threshold for the one or more performance parameters). In some examples, the UE 415 may receive the one or more signals including the monitoring input data according to periodicity such that the UE 415 has the most up-to-date monitoring input data for monitoring the machine learning model. The node 405 may transmit the one or more signals to the UE 415 via unicast or broadcast.

At 425, the UE 415 may detect the event trigger for reporting the one or more performance parameters. In some examples, the UE 415 may detect the event trigger while monitoring the machine learning model. Monitoring the machine learning model may include the UE 415 inputting machine learning data into the machine learning model to generate machine learning output data and comparing the machine learning output data to the monitoring input data (e.g., the ground truth) to generate the one or more performance parameters. In some examples, the types of performance parameters generated by the UE 415 may be based on the control signal received at 410. In some examples, the UE 415 may perform the monitoring on the machine learning model after receiving each of the one or more signals including the monitoring input data until the UE 415 detects the event trigger. That is, the UE 415 may generate the one or more performance parameters for each received monitoring input data.

At 430, upon detecting the event trigger, the UE 415 may transmit a monitor report including the one or more performance parameters to the node 405. In some examples, the one or more performance parameters may be the most recently generated one or more performance parameters by the UE 415 before detecting the event trigger.

At 435, the node 405 may determine to update or switch the machine learning model at the UE 415 and perform a model switching procedure with the UE 415. In some examples, the node 405 may determine to update or switch the machine learning model at the UE 415 if the one or more performance parameters falls below a threshold. In some examples, the UE 415 may be configured with multiple machine learning models. For example, the UE 415 may be configured with the machine learning model and a second machine learning model (e.g., associated with a same MLFN). In such example, the node 405 may transmit a signal (e.g., L2 signal or a MAC control element (MAC-CE)) activating the second machine learning model. In another example, the UE 415 may be configured with a single machine learning model (e.g., associated with the MLFN). For example, the UE 415 may be configured with the machine learning model. In such example, the node 405 may transmit a signal (e.g., L3 signal or an RRC reconfiguration message) configuring the UE 415 with a second machine learning model and transmit a signal (e.g., L2 signal or a MAC-CE) activating the second machine learning model.

Alternatively, at 440, the node 405 may determine to deactivate the machine learning model at the UE 415. In such example, the UE 415 may receive a signal (e.g., L2 signal or a MAC-CE) deactivating the machine learning model.

Figure 5:
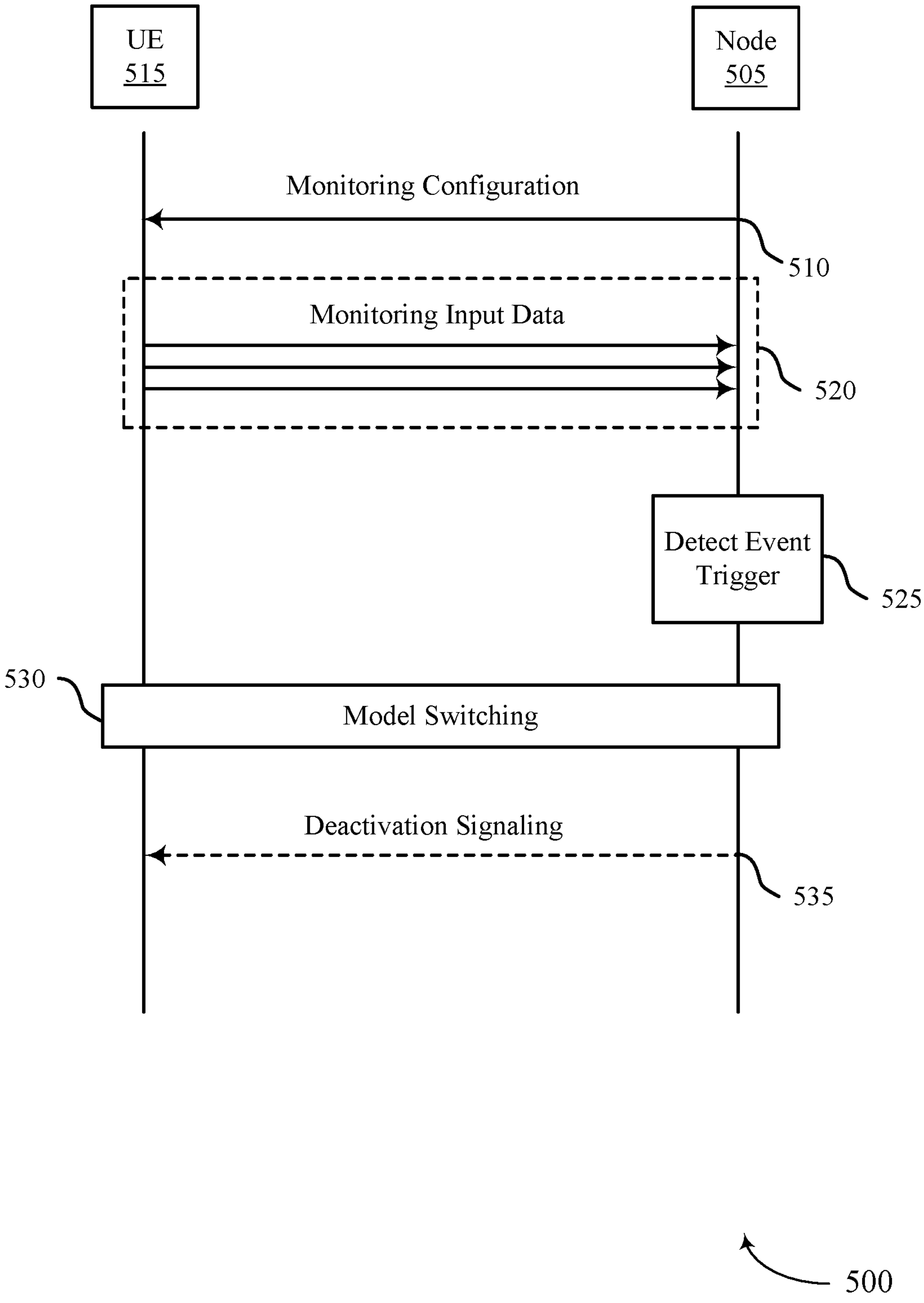

FIG. 5 illustrates an example of a process flow 500 that supports monitoring and updating machine learning models in accordance with one or more aspects of the present disclosure. In some examples, the process flow 500 may be implemented by a UE 515 and a node 505. The UE 515 may be an example of a UE 115, a UE 215, a UE 315, or a UE 415 as described with reference to FIGS. 1 through 4, respectively. The node 505 may be an example of a network entity 105, a CU 160, a node 305-*a*, or a node 405 as described with reference to FIGS. 1 through 4, respectively. Alternative examples of the following may be implemented, where steps are performed in a different order than described or are not performed at all. In some cases, steps may include additional features not mentioned below or further features may be added.

At 510, the UE 515 may receive a control signal including a monitoring configuration from the node 505. In some examples, the monitoring configuration may include a list of types of monitoring input data to provide to the node 505. In one example, the node 505 may request for the UE 515 to provide a ground truth for a machine learning model or metadata associated with the machine learning model (e.g., a threshold) such that the node 505 may evaluate one or more performance parameters associated with the machine learning model. The one or more performance parameters may include performance KPIs (e.g., interference latency) or system KPIs (e.g., network loading). In some examples, the control signal may be an example of an RRC configuration message. Further, in some examples, upon receiving the control signal, the UE 515 may transmit a signal to the node 505 indicating that the UE 515 successfully received and implemented the control signal (e.g., an RRC configuration complete message).

At 520, upon receiving the control signal, the UE 515 may transmit one or more signals including the monitoring input data to the node 505. In some examples, the UE 515 may determine the types of monitoring input data to include in the one or more signals based on the control signal received at 510. In some examples, the node 505 may receive the one or more signals including the monitoring input data according to periodicity such that the node 505 has the most up-to-date monitoring input data for monitoring the machine learning model. In some examples, the UE 515 may transmit the one or more signals to the node 505 via unicast.

At 525, the node 505 may detect an event trigger for generating the one or more performance parameters. The event trigger may include a settings change (e.g., the node 505 detects a change in a number of antennas the UE 515 uses to communicate with the node 505), a location change (e.g., the node 505 detects the UE 515 moves from an indoor environment to an outdoor environment, a service change (e.g., the node detects a change in a QoS flow utilized by the UE 515), or a value of the one or more performance parameters satisfying a threshold (e.g., falling below a threshold). In some examples, the node 505 may detect the event trigger while monitoring the machine learning model. Monitoring the machine learning model may include the node 505 inputting machine learning data into the machine learning model to generate machine learning output data and comparing the machine learning output data to the monitoring input data (e.g., the ground truth) to generate the one or more performance parameters (e.g., performance or system KPIs). In some examples, the node 505 may perform the monitoring on the machine learning model after receiving each of the one or more control signals including the monitoring input data until the node 505 detects the event trigger. That is, the node 505 may generate the one or more performance parameters for each received monitoring input data.

At 530, upon detecting the event trigger, the node 505 may determine to update or switch the machine learning model at the UE 515 and perform a model switching procedure with the UE 515. In some examples, the node 505 may determine to update or switch the machine learning model at the UE 515 if the one or more performance parameters falls below a threshold. In some examples, the UE 515 may be configured with multiple machine learning models. For example, the UE 515 may be configured with the machine learning model and a second machine learning model (e.g., associated with a same MLFN). In such example, the node 505 may transmit a signal (e.g., L2 signal or a MAC-CE) activating the second machine learning model. In another example, the UE 515 may be configured with a single machine learning model (e.g., associated with the MLFN). For example, the UE 515 may be configured with the machine learning model. In such example, the node 505 may transmit a signal (e.g., L3 signal or an RRC reconfiguration message) configuring the UE 515 with a second machine learning model and transmit a signal (e.g., L2 signal or a MAC-CE) activating the second machine learning model.

Alternatively, at 535, the node 505 may determine to deactivate the machine learning model at the UE 515. In such example, the UE 515 may receive a signal (e.g., L2 signal or a MAC-CE) deactivating the machine learning model.

Figure 6:
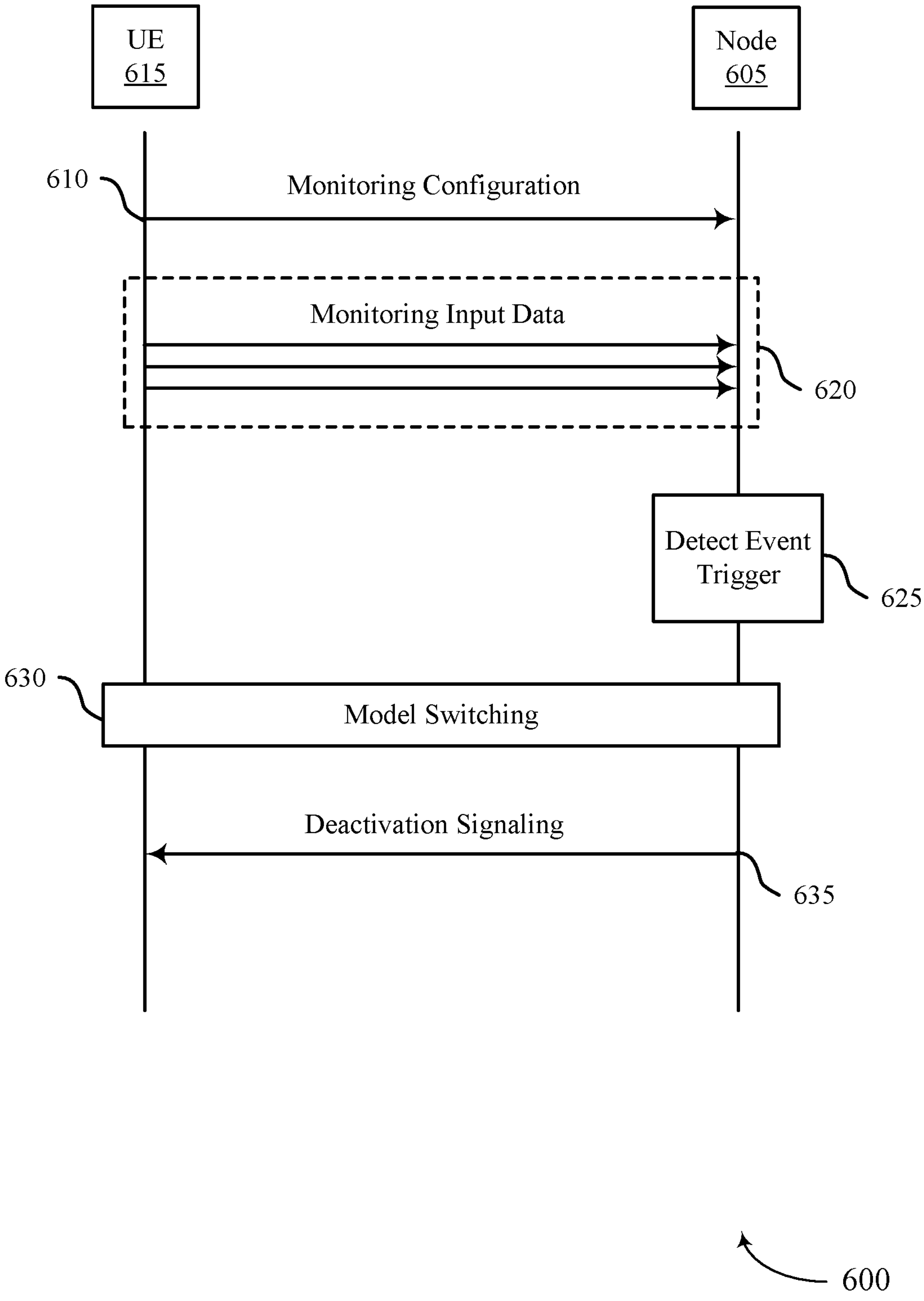

FIG. 6 illustrates an example of a process flow 600 that supports monitoring and updating machine learning models in accordance with one or more aspects of the present disclosure. In some examples, the process flow 600 may be implemented by a UE 615 and a node 605. The UE 615 may be an example of a UE 115, a UE 215, a UE 315, a UE 415, or a UE 515 as described with reference to FIGS. 1 through 5, respectively. The node 605 may be an example of a network entity 105, a CU 160, a node 305-*a*, a node 405, or a node 505 as described with reference to FIGS. 1 through 5, respectively. Alternative examples of the following may be implemented, where steps are performed in a different order than described or are not performed at all. In some cases, steps may include additional features not mentioned below or further features may be added.

At 610, the node 605 may receive a control signal including a monitoring configuration from the UE 615. In some examples, the monitoring configuration may indicate an event trigger (or a list of event triggers) for reporting one or more performance parameters associated with a machine learning model. That is, the UE 615 may request or dictate the event trigger. The event trigger may include a settings change (e.g., the node 605 detects a change in a number of antennas the UE 615 uses to communicate with the node 605), a location change (e.g., the node 605 detects the UE 615 moving from an indoor environment to an outdoor environment), a service change (e.g., the node 605 detects a change in a QoS flow utilized by the UE 615 and the node 605), or a value of the one or more performance parameters satisfying a threshold (e.g., falling below a threshold). Moreover, the one or more performance parameters may include performance KPIs (e.g., interference latency) or system KPIs (e.g., network loading). In some examples, the control signal may be included in UE assistance information (UAI).

At 620, the node 605 may receive one or more signals including monitoring input data from the UE 615. In some examples, the monitoring input data may include one or both of ground truth for evaluating the one or more performance parameters (e.g., performance or system KPIs) or metadata for evaluating a model switching condition (e.g., the threshold corresponding to the event trigger). In some examples, the node 605 may receive the one or more signals including the monitoring input data according to periodicity such that the node 605 has the most up-to-date monitoring input data for monitoring the machine learning model. The UE 615 may transmit the one or more signals to the node 605 via unicast.

At 625, the node 605 may detect an event trigger for generating the one or more performance parameters. In some examples, the node 605 may detect the event trigger while monitoring the machine learning model. Monitoring the machine learning model may include the node 605 inputting machine learning data into the machine learning model to generate machine learning output data and comparing the machine learning output data to the monitoring input data (e.g., the ground truth) to generate the one or more performance parameters (e.g., performance or system KPIs). In some examples, the node 605 may perform the monitoring on the machine learning model after receiving each of the one or more control signals including the monitoring input data until the node 605 detects the event trigger. That is, the node 605 may generate the one or more performance parameters for each received monitoring input data.

At 630, upon detecting the event trigger, the node 605 may determine to update or switch the machine learning model at the UE 615 and perform a model switching procedure with the UE 615. In some examples, the node 605 may determine to update or switch the machine learning model at the UE 615 if the one or more performance parameters falls below a threshold. In some examples, the UE 615 may be configured with multiple machine learning models. For example, the UE 615 may be configured with the machine learning model and a second machine learning model (e.g., associated with a same MLFN). In such example, the node 605 may transmit a signal (e.g., L2 signal or a MAC-CE) activating the second machine learning model. In another example, the UE 615 may be configured with a single machine learning model (e.g., associated with the MLFN). For example, the UE 615 may be configured with the machine learning model. In such example, the node 605 may transmit a signal (e.g., L3 signal or an RRC reconfiguration message) configuring the UE 615 with a second machine learning model and transmit a signal (e.g., L2 signal or a MAC-CE) activating the second machine learning model.

Alternatively, at 635, the node 605 may determine to deactivate the machine learning model at the UE 615. In such example, the UE 615 may receive a signal (e.g., L2 signal or a MAC-CE) deactivating the machine learning model.

Figure 7:
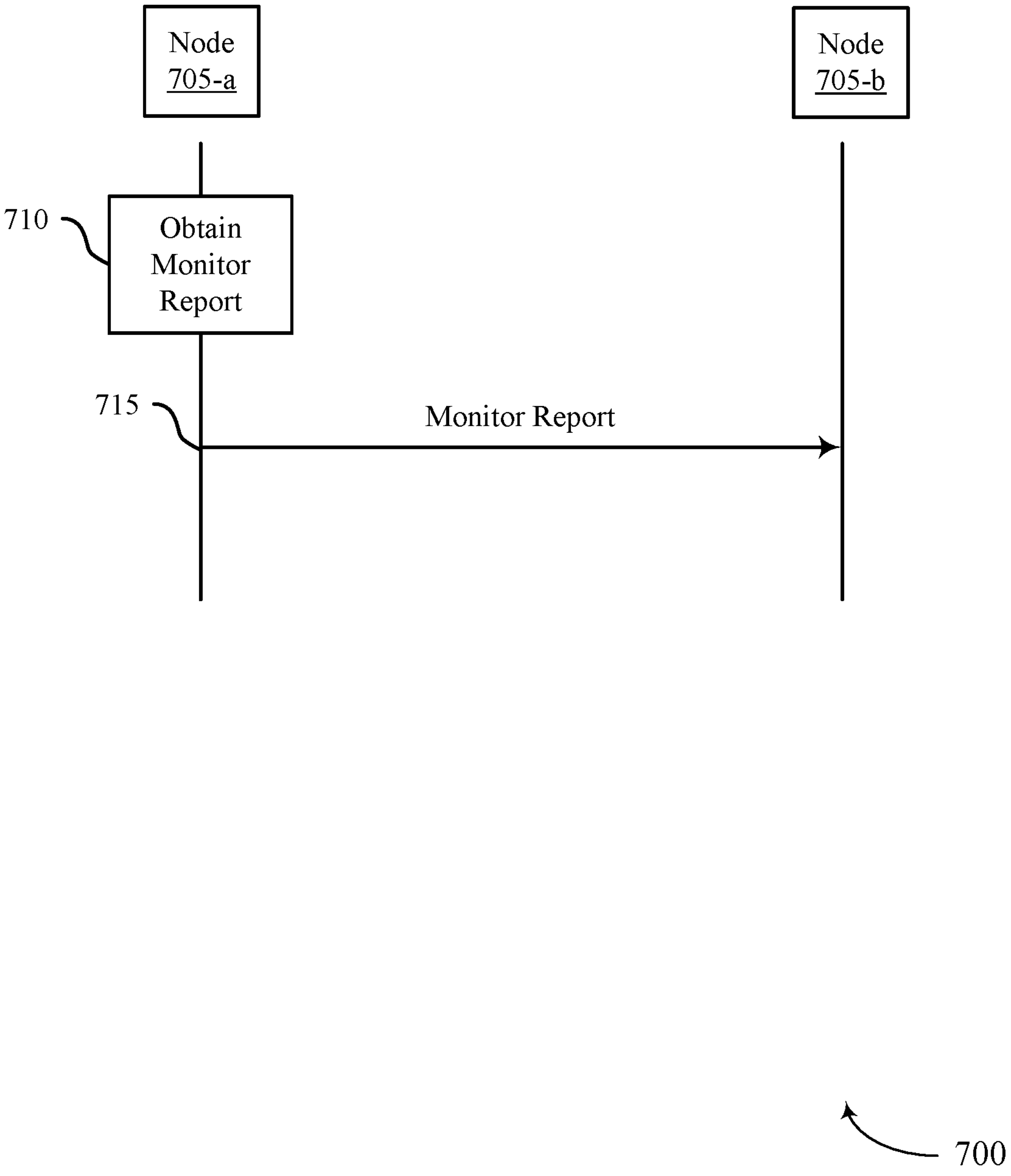

FIG. 7 illustrates an example of a process flow 700 that supports monitoring and updating machine learning models in accordance with one or more aspects of the present disclosure. In some examples, the process flow 700 may be implemented by a node 705-*a* and a node 705-*b*. The node 705-*a* may be an example of a network entity 105, a CU 160, a node 305-*a*, a node 405, a node 505, or a node 605 as described with reference to FIGS. 1 through 6, respectively. The node 705-*b* may be an example of a network entity 105, a DU 165, or a node 305-*b* as described with reference to FIGS. 1 through 3, respectively. Alternative examples of the following may be implemented, where steps are performed in a different order than described or are not performed at all. In some cases, steps may include additional features not mentioned below or further features may be added.

At 710, the node 705-*a* may obtain a monitor report. In some examples, the node 705-*a* may obtain the monitor report from a UE. The UE may generate the monitor report upon detecting an event trigger. In another example, the node 705-*a* may generate the monitoring report upon detecting the event trigger. The event trigger may include a settings change (e.g., the UE or the node 705-*a* detects a change in a number of antennas the UE uses to communicate with the node 705-*a*), a location change (e.g., the UE or the node 705-*a* detects that the UE moves from an indoor environment to an outdoor environment), a service change (e.g., the UE or the node 705-*a* detects a change in a QoS flow utilized by the UE), or one or more performance parameters associated with a machine learning model satisfying a threshold (e.g., falling below a threshold). In some examples, the monitor report may include the one or more performance parameters associated with the machine learning model. Examples of the one or more performance parameters may be performance KPIs (e.g., interference latency) or system KPIs (e.g., network loading).

At 715, the node 705-*a* may transmit the monitor report to the node 705-*b*. In some examples, the node 705-*a* may be an example of a first network entity and the node 705-*b* may be an example of a second network entity (e.g., neighboring network entity). In such example, the node 705-*a* may transmit the monitor report to the node 705-*b* via the Xn interface. In another example, the node 705-*a* may be an example of a CU and the node 705-*b* may be an example of a DU. In such example, the node 705-*a* may transmit the monitor report to the node 705-*b* via the F1 interface. In some examples, the monitor report may be included in one or more messages exchanged between the node 705-*a* and the node 705-*b* during a handover procedure (e.g., measurement reports, handover request, or mobility control information). Alternatively, the monitor report may be included in a resource status update message or other existing Xn or F1 messages. In some examples, the node 705-*b* (e.g., the target node) may utilize the monitor report to optimize machine learning configuration parameters (e.g., a set of parameters per MS ID).

Figure 8:
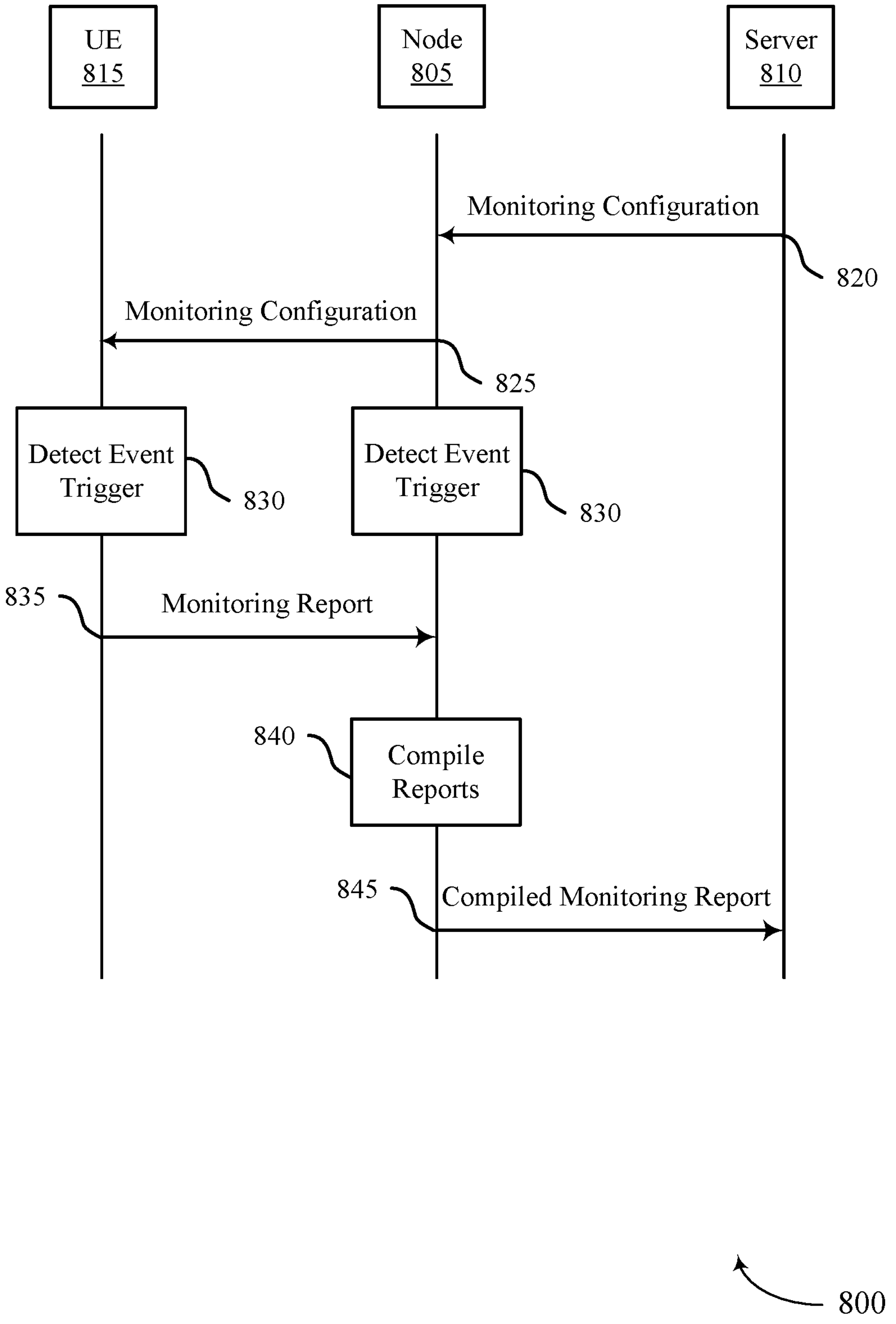

FIG. 8 illustrates an example of a process flow 800 that supports monitoring and updating machine learning models in accordance with one or more aspects of the present disclosure. In some examples, the process flow 800 may be implemented by a node 805, a UE 815, and a server 810. The node 805 may be an example of a network entity 105, a CU 160, a node 305-*a*, a node 405, a node 505, a node 605, or a node 705-*a* as described with reference to FIGS. 1 through 7, respectively. The UE 815 may be an example of a UE 115, a UE 215, a UE 315, a UE 415, a UE 515, or a UE 615 as described with reference to FIGS. 1 through 6. The server 810 may be an example of a server 310 as described with reference to FIG. 3. Further, the server may be an example of an operations, administration, and maintenance (OAM) server, an edge cloud, a UE-MR, a third party server, a network data analytics function (NWDAF) server, or a an MC. Alternative examples of the following may be implemented, where steps are performed in a different order than described or are not performed at all. In some cases, steps may include additional features not mentioned below or further features may be added.

At 820, the node 805 may receive a control signal including a monitoring configuration from the server 810. In some examples, the monitoring configuration may indicate an event trigger (or a list of event triggers) for reporting one or more performance parameters associated with a machine learning model. The event trigger may include a settings change (e.g., the node 805 or the UE 815 detects a change in a number of antennas the UE 815 uses to communicate with the node 805), a location change (e.g., the node 805 or the UE 815 detects the UE 815 moving from an indoor environment to an outdoor environment), a service change (e.g., the node 805 or the UE 815 detects a change in a QoS flow utilized by the UE 815 and the node 805), or a value of one or more performance parameters associated with a machine learning model satisfying a threshold (e.g., falling below a threshold). The one or more performance parameters may include performance KPIs (e.g., interference latency) or system KPIs (e.g., network loading). Further, in some examples, the control signal may include a request for the node 805 to report the one or more performance parameters generated via UE-side monitoring of the machine learning model or node-side monitoring. In some examples, the control signal may be an example of an HTTP message. Additionally, the node 805 may transmit (or forward) the control signal including the monitoring configuration to UE 815 at 825.

In some examples, upon receiving the control signal including the monitoring configuration, the UE 815 and the node 805 may exchange one or more signals including monitoring input data. In some examples, the monitoring input data may include one or both of ground truth for evaluating the one or more performance parameters (e.g., performance or system KPIs) or metadata for evaluating a model switching condition (e.g., the threshold corresponding to the event trigger).

At 830, one or both of the UE 815 or the node 805 may detect the event trigger for generating the one or more performance parameters. In some examples, the node 805 or the UE 815 may detect the event trigger while monitoring the machine learning model. Monitoring the machine learning model may include the node 805 or the UE 815 inputting machine learning data into the machine learning model to generate machine learning output data and comparing the machine learning output data to the monitoring input data (e.g., the ground truth) to generate the one or more performance parameters (e.g., performance or system KPIs). In some examples, the node 805 or the UE 815 may perform the monitoring on the machine learning model after receiving each of the one or more control signals including the monitoring input data until the node 805 or the UE 815 detects the event trigger. That is, the node 805 or the UE 815 may generate the one or more performance parameters for each received monitoring input data.

At 835, upon detecting the event trigger, the UE 815 may generate a monitor report including the one or more performance parameters and transmit the monitor report to the node 805. Further, at 835, the node 805 may generate a monitor report including the one or more performance parameters upon detecting the event trigger. In some examples, the one or more performance parameters may be the most recently generated one or more performance parameters by the UE 815 or the node 805 before detecting the event trigger.

At 840, the node 805 may compile monitor reports into a single compiled monitor report. The single compiled monitor report may include the one or more performance parameters included in the monitor report received from the UE 815 and the one or more performance parameters included in the monitor report generated by the node 805.

At 845, the node 805 may transmit the compiled monitor report to the server 810. In some examples, the node 805 may transmit the compiled monitor report to the server upon detecting an event trigger (e.g., an event trigger that is the same or different from the event trigger indicated in the control signal) or the node 805 may transmit the compiled monitor report according to periodicity. That is, the node 805 may compile the monitoring reports and transmit the compiled monitor report to the server 810 during a next periodic occasion. In some examples, the server 810 may utilize the compiled report for parameter retuning (e.g., refining the machine learning model at the UE 815 or the node 805) or for machine learning model training (e.g., offline federated learning). In some examples, the server 810 may perform parameter retuning or machine learning model training if one or more of the performance parameters included in the monitor report falls below a threshold.

Figure 9:
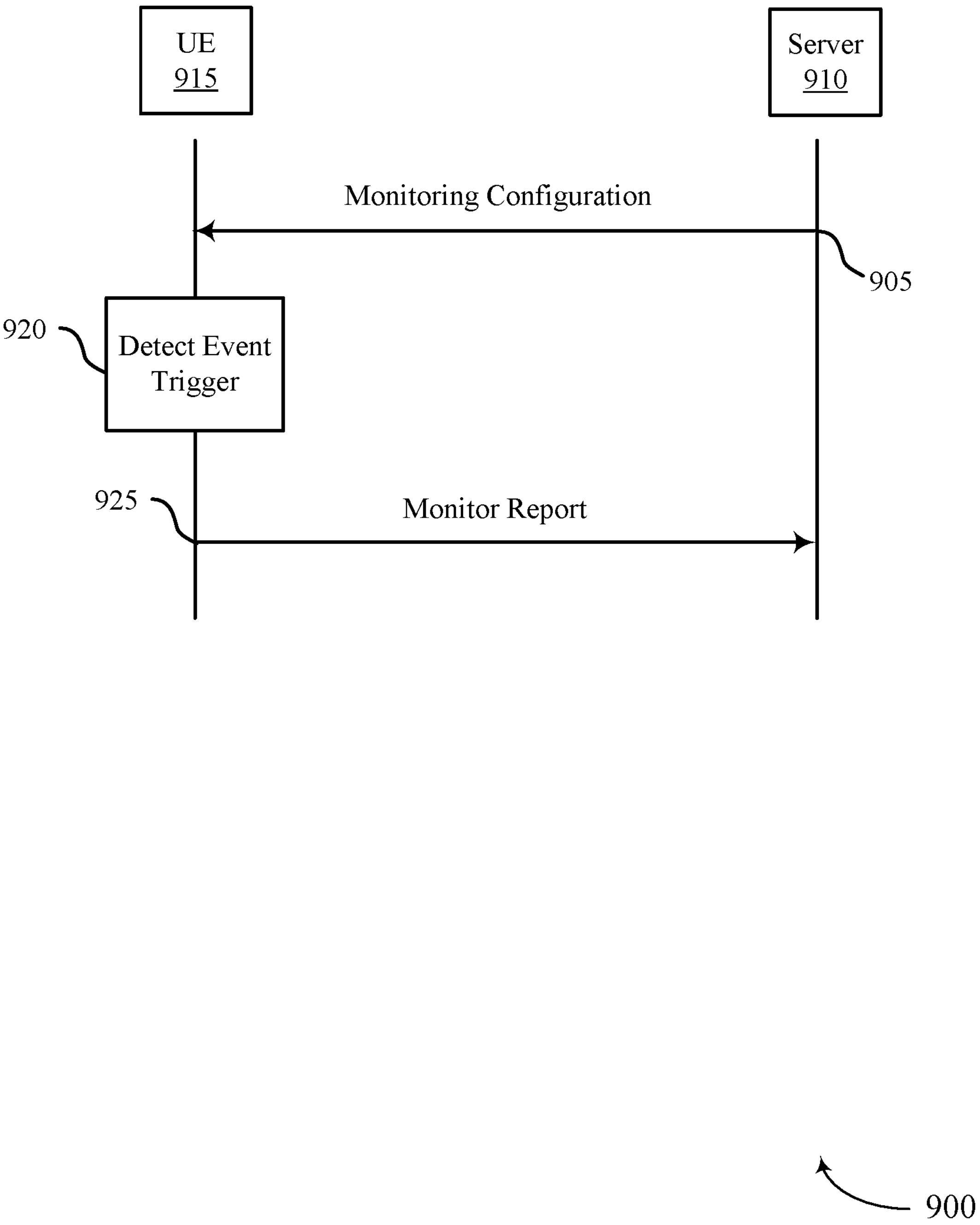

FIG. 9 illustrates an example of a process flow 900 that supports monitoring and updating machine learning models in accordance with one or more aspects of the present disclosure. In some examples, the process flow 900 may be implemented by a UE 915 and a server 910. The UE 915 may be an example of a UE 115, a UE 215, a UE 315, a UE 415, a UE 515, a UE 615, or a UE 815 as described with reference to FIGS. 1 through 6 as well as FIG. 8. The server 910 may be an example of a server 310 and a server 810 as described with reference to FIGS. 3 and 8. Further, the server 910 may be an example of an OAM server, an edge cloud, a UE-MR, a third party server, an NWDAF server, or an RIC. Alternative examples of the following may be implemented, where steps are performed in a different order than described or are not performed at all. In some cases, steps may include additional features not mentioned below or further features may be added.

At 905, the UE 915 may receive a control signal including a monitoring configuration from the server 910. In some examples, the monitoring configuration may indicate an event trigger (or a list of triggering events) for reporting one or more performance parameters associated with a machine learning model. The event trigger may include a settings change (e.g., the UE 915 detects a change in a number of antennas the UE 915 uses to communicate with a node), a location change (e.g., UE 915 detects the UE 915 moving from an indoor environment to an outdoor environment), a service change (e.g., the UE 915 detects a change in a QoS flow utilized by the UE 915 and the node), or a value of one or more performance parameters associated with a machine learning model satisfying a threshold (e.g., falling below a threshold). The one or more performance parameters may include performance KPIs (e.g., interference latency) or system KPIs (e.g., network loading). Further, in some examples, the control signal may include a request for the UE 915 to report the one or more performance parameters generated via UE-side monitoring of the machine learning model. In some examples, the control signal may be an example of an HTTP message.

In some examples, upon receiving the control signal including the monitoring configuration, the UE 915 may receive one or more signals including monitoring input data from the node. In some examples, the monitoring input data may include one or both of ground truth for evaluating the one or more performance parameters (e.g., performance or system KPIs) or metadata for evaluating a model switching condition (e.g., the threshold corresponding to the event trigger). In some examples, the UE 915 may receive the one or more signals including the monitoring input data according to periodicity such that the UE 915 has the most up-to-date monitoring input data for monitoring the machine learning model. The node may transmit the one or more signals to the UE 915 via unicast or broadcast.

At 920, the UE 915 may detect the event trigger for generating the one or more performance parameters. In some examples, the UE 915 may detect the event trigger while monitoring the machine learning model. Monitoring the machine learning model may include the UE 915 inputting machine learning data into the machine learning model to generate machine learning output data and comparing the machine learning output data to the monitoring input data (e.g., the ground truth) to generate the one or more performance parameters (e.g., performance or system KPIs). In some examples, the UE 915 may perform the monitoring on the machine learning model after receiving each of the one or more signals including the monitoring input data until the UE 915 detects the event trigger. That is, the UE 915 may generate the one or more performance parameters for each received monitoring input data.

At 925, upon detecting the event trigger, the UE 915 may generate a monitor report including the one or more performance parameters and transmit the monitor report to the server 910. In some examples, the one or more performance parameters may be the most recently generated one or more performance parameters by the UE 915 before detecting the event trigger. Additionally, the monitor report may include the machine learning input data and the machine learning output data (e.g., used during interference). In some examples, the server 910 may utilize the monitor report for parameter retuning (e.g., refining the machine learning model at the UE 915) or for machine learning model training (e.g., offline federated learning). In some examples, the server 910 may perform parameter retuning or machine learning model training if one or more of the performance parameters included in the monitor report falls below a threshold.

Figure 10:
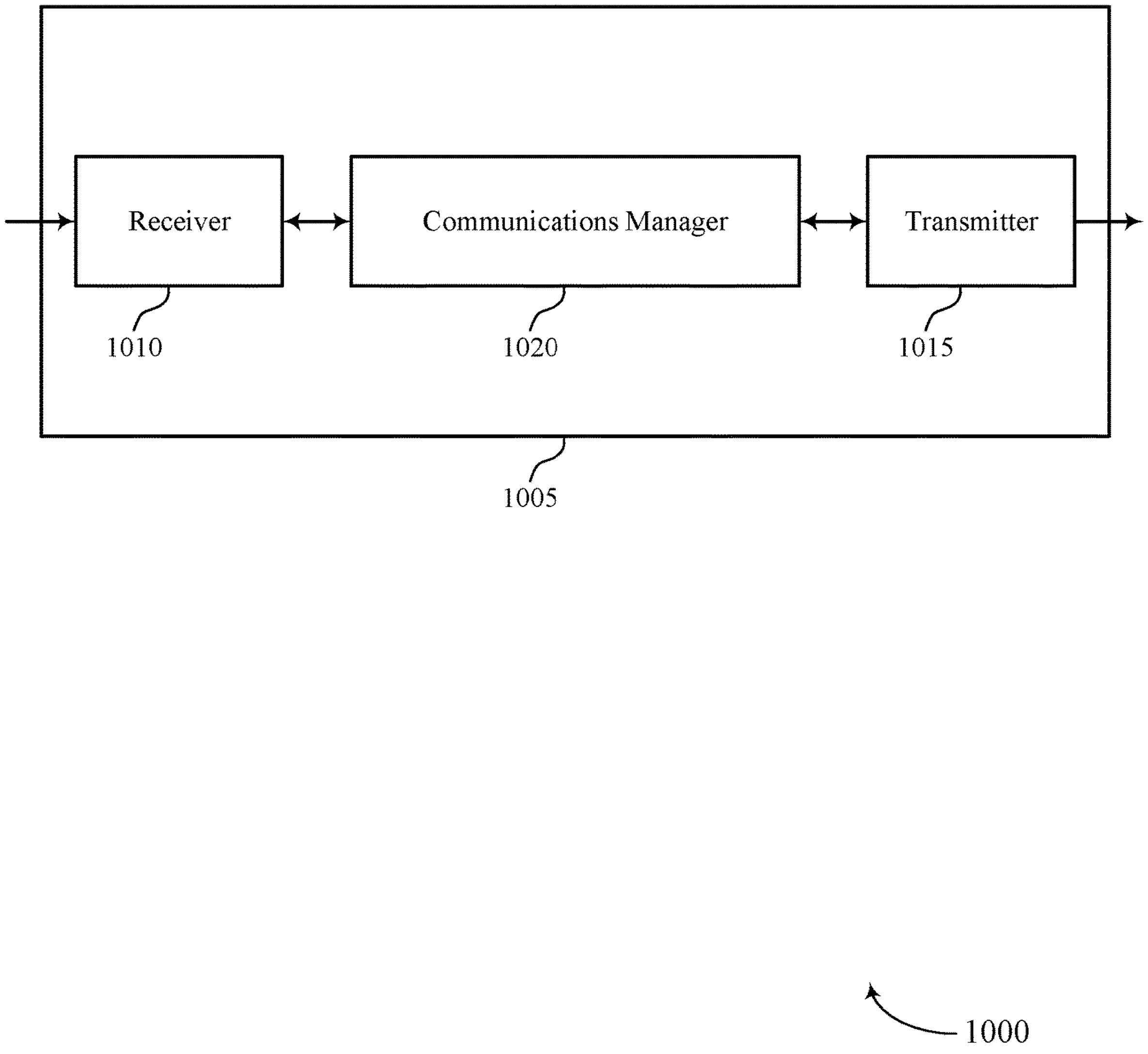
FIGS. 10 and 11 show block diagrams of devices that support monitoring and updating machine learning models in accordance with one or more aspects of the present disclosure.

FIG. 10 shows a block diagram 1000 of a device 1005 that supports monitoring and updating machine learning models in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to monitoring and updating machine learning models). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to monitoring and updating machine learning models). In some examples, the transmitter 1015 may be co-located with a receiver 1010 in a transceiver. The transmitter 1015 may utilize a single antenna or a set of multiple antennas.

The communications manager 1020, the receiver 1010, the transmitter 1015, or various combinations thereof or various components thereof may be examples of means for performing various aspects of monitoring and updating machine learning models as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. For example, the communications manager 1020 may be configured as or otherwise support a means for receiving a control signal indicating an event trigger for reporting a performance parameter associated with a machine learning model. The communications manager 1020 may be configured as or otherwise support a means for receiving one or more signals indicating input data for monitoring a performance of the machine learning model by the UE. The communications manager 1020 may be configured as or otherwise support a means for transmitting a report including the performance parameter based on detecting the event trigger, where the performance parameter is based on monitoring the performance of the machine learning model and on a comparison between the input data and output data of the machine learning model.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, more efficient utilization of communication resources.

Figure 11:
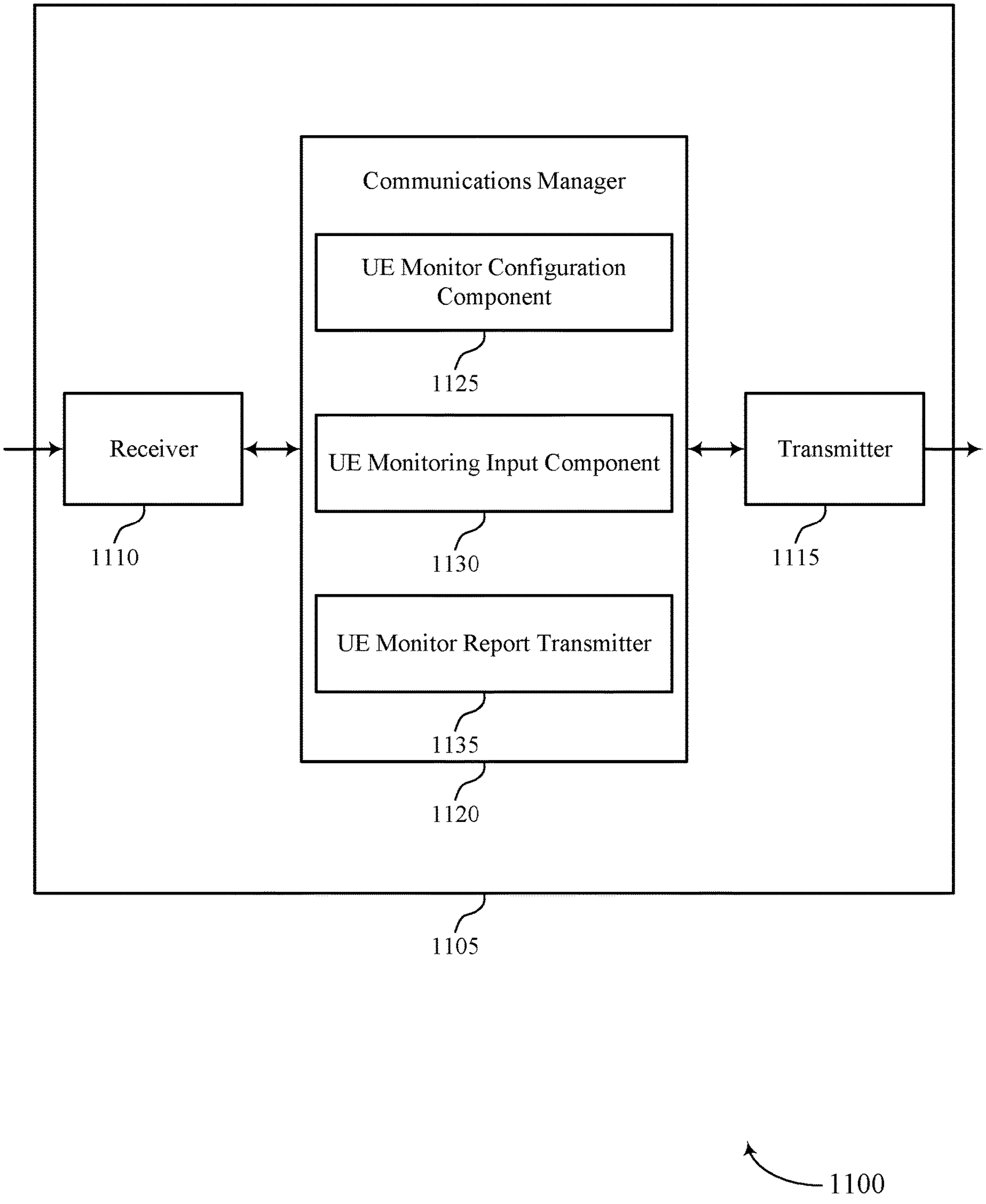

FIG. 11 shows a block diagram 1100 of a device 1105 that supports monitoring and updating machine learning models in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to monitoring and updating machine learning models). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to monitoring and updating machine learning models). In some examples, the transmitter 1115 may be co-located with a receiver 1110 in a transceiver. The transmitter 1115 may utilize a single antenna or a set of multiple antennas.

The device 1105, or various components thereof, may be an example of means for performing various aspects of monitoring and updating machine learning models as described herein. For example, the communications manager 1120 may include a UE monitor configuration component 1125, a UE monitoring input component 1130, a UE monitor report transmitter 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. The UE monitor configuration component 1125 may be configured as or otherwise support a means for receiving a control signal indicating an event trigger for reporting a performance parameter associated with a machine learning model. The UE monitoring input component 1130 may be configured as or otherwise support a means for receiving one or more signals indicating input data for monitoring a performance of the machine learning model by the UE. The UE monitor report transmitter 1135 may be configured as or otherwise support a means for transmitting a report including the performance parameter based on detecting the event trigger, where the performance parameter is based on monitoring the performance of the machine learning model and on a comparison between the input data and output data of the machine learning model.

Figure 12:
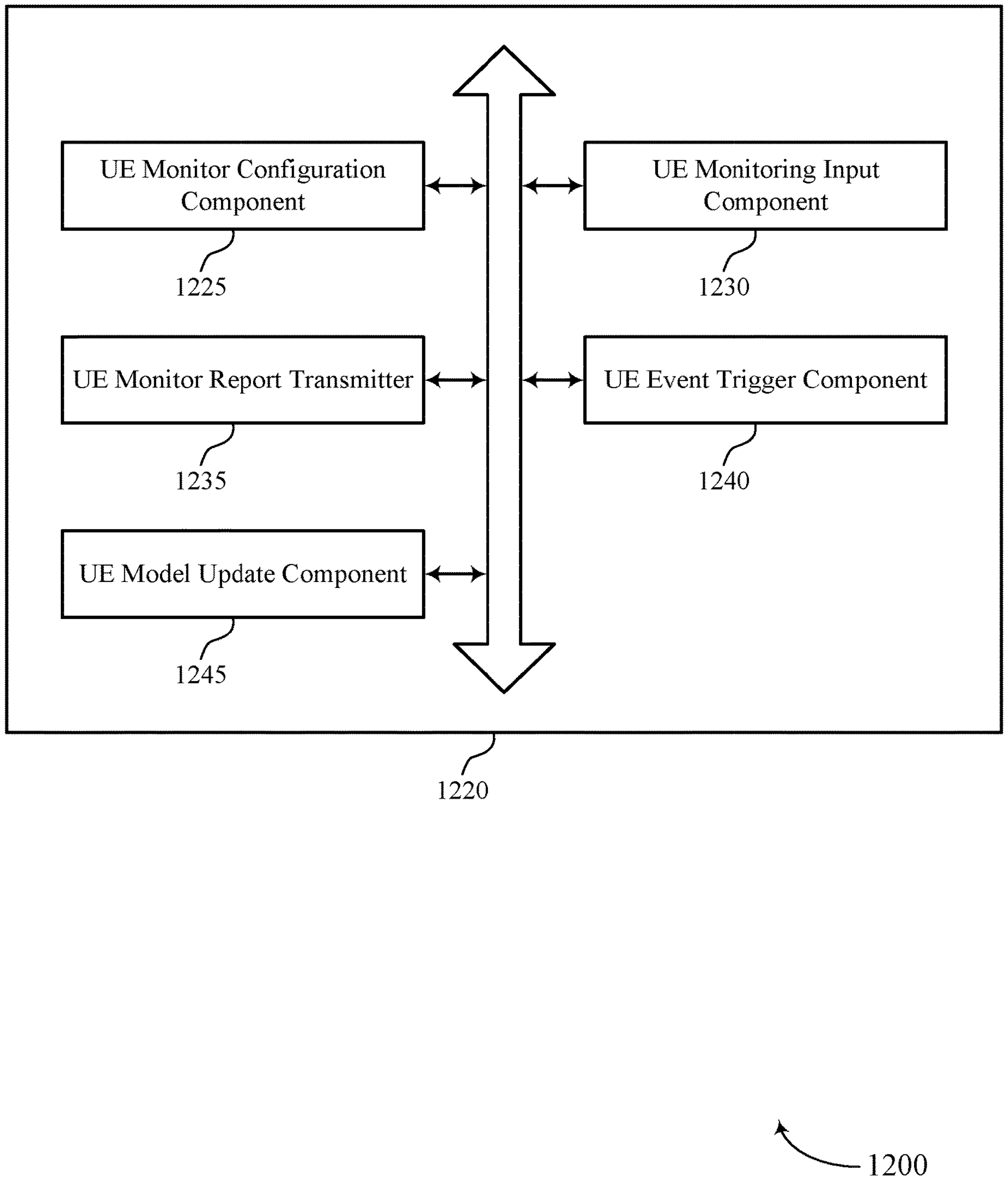
FIG. 12 shows a block diagram of a communications manager that supports monitoring and updating machine learning models in accordance with one or more aspects of the present disclosure.

FIG. 12 shows a block diagram 1200 of a communications manager 1220 that supports monitoring and updating machine learning models in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of monitoring and updating machine learning models as described herein. For example, the communications manager 1220 may include a UE monitor configuration component 1225, a UE monitoring input component 1230, a UE monitor report transmitter 1235, a UE event trigger component 1240, a UE model update component 1245, or any combination thereof. Each of these components may communicate, directly or indirectly, with one another (e.g., via one or more buses).

The communications manager 1220 may support wireless communications at a UE in accordance with examples as disclosed herein. The UE monitor configuration component 1225 may be configured as or otherwise support a means for receiving a control signal indicating an event trigger for reporting a performance parameter associated with a machine learning model. The UE monitoring input component 1230 may be configured as or otherwise support a means for receiving one or more signals indicating input data for monitoring a performance of the machine learning model by the UE. The UE monitor report transmitter 1235 may be configured as or otherwise support a means for transmitting a report including the performance parameter based on detecting the event trigger, where the performance parameter is based on monitoring the performance of the machine learning model and on a comparison between the input data and output data of the machine learning model.

In some examples, to support detecting the event trigger, the UE event trigger component 1240 may be configured as or otherwise support a means for detecting a change in one or more communication parameters associated with the UE, where the one or more communication parameters include a number of antennas used for communication between the UE and a node, active component carriers used for communication between the UE and the node, a location of the UE with respect to the node, an orientation of the UE, a velocity of the UE, network slicing, a QoS flow, a session, or a combination thereof.

In some examples, to support detecting the event trigger, the UE event trigger component 1240 may be configured as or otherwise support a means for detecting the performance parameter satisfies a threshold.

In some examples, the UE model update component 1245 may be configured as or otherwise support a means for receiving a second control signal indicating one or more parameters associated with the machine learning model based on transmitting the report. In some examples, the UE model update component 1245 may be configured as or otherwise support a means for updating the machine learning model based on the one or more parameters associated with the machine learning model.

In some examples, the UE model update component 1245 may be configured as or otherwise support a means for receiving a second control signal configuring the UE with a second machine learning model or activating the second machine learning model based on transmitting the report. In some examples, the UE model update component 1245 may be configured as or otherwise support a means for implementing the second machine learning model to perform one or more wireless communication procedures based at in part the second control signal.

In some examples, the UE monitor configuration component 1225 may be configured as or otherwise support a means for transmitting a second control signal indicating that the UE successfully received and implemented the control signal, where receiving the one or more signals is based on transmitting the second control signal.

In some examples, to support receiving the one or more signals, the UE monitoring input component 1230 may be configured as or otherwise support a means for receiving a set of multiple signals according to a periodicity.

In some examples, the input data includes metadata corresponding to evaluating the performance of the machine learning model, ground truth for the machine learning model, one or more thresholds associated with the performance parameter, or a combination thereof.

In some examples, the performance parameter includes a system key performance indicator or an interference key performance indicator. In some examples, the report further includes input data and the output data of the machine learning model.

Figure 13:
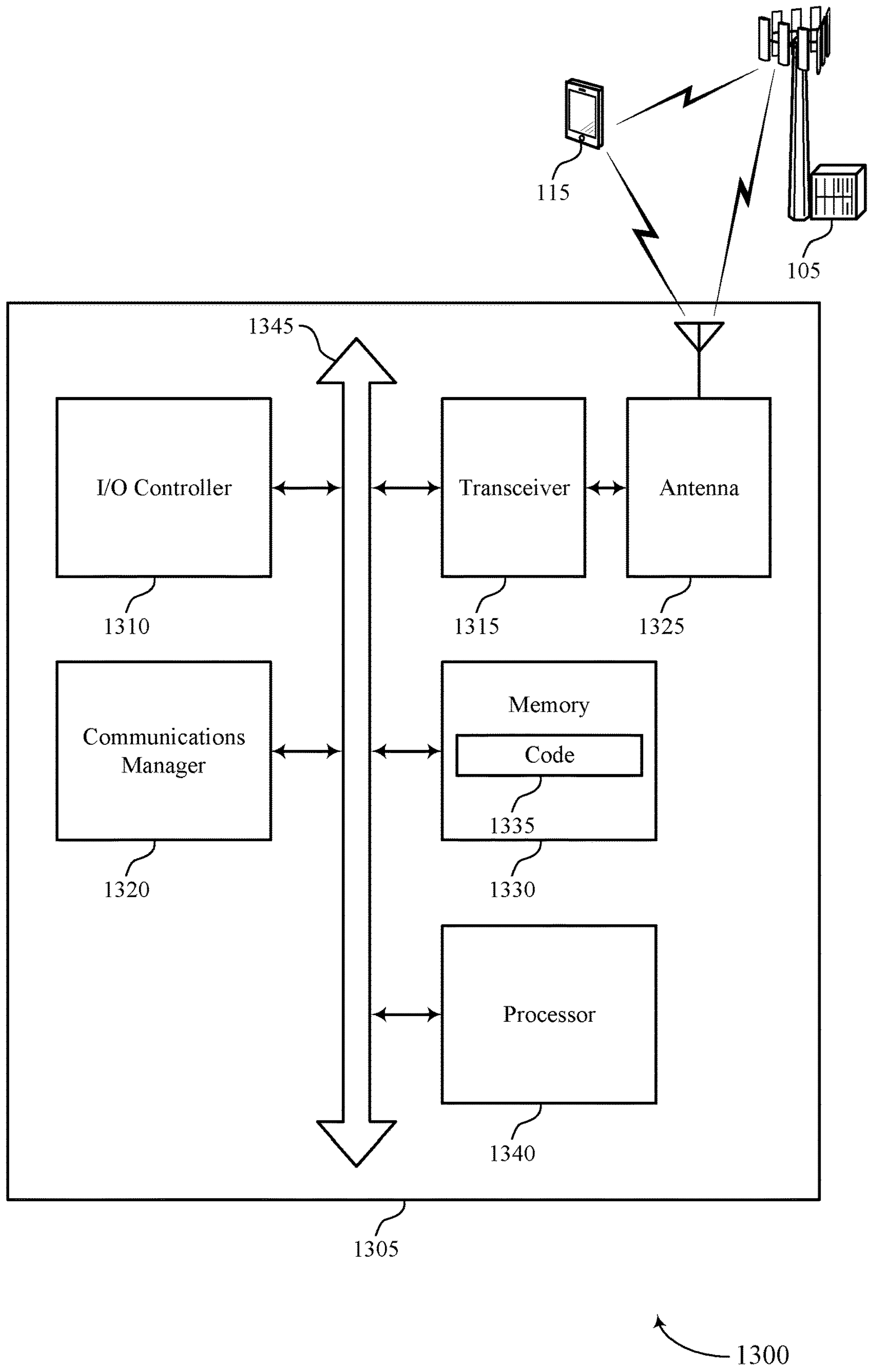
FIG. 13 shows a diagram of a system including a device that supports monitoring and updating machine learning models in accordance with one or more aspects of the present disclosure.

FIG. 13 shows a diagram of a system 1300 including a device 1305 that supports monitoring and updating machine learning models in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting monitoring and updating machine learning models). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving a control signal indicating an event trigger for reporting a performance parameter associated with a machine learning model. The communications manager 1320 may be configured as or otherwise support a means for receiving one or more signals indicating input data for monitoring a performance of the machine learning model by the UE. The communications manager 1320 may be configured as or otherwise support a means for transmitting a report including the performance parameter based on detecting the event trigger, where the performance parameter is based on monitoring the performance of the machine learning model and on a comparison between the input data and output data of the machine learning model.

By including or configuring the communications manager 1320 in accordance with examples as described herein, the device 1305 may support techniques for improved user experience related to reduced processing, reduced power consumption, more efficient utilization of communication resources, and improved coordination between devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of monitoring and updating machine learning models as described herein, or the processor 1340 and the memory 1330 may be otherwise configured to perform or support such operations.

Figure 14:
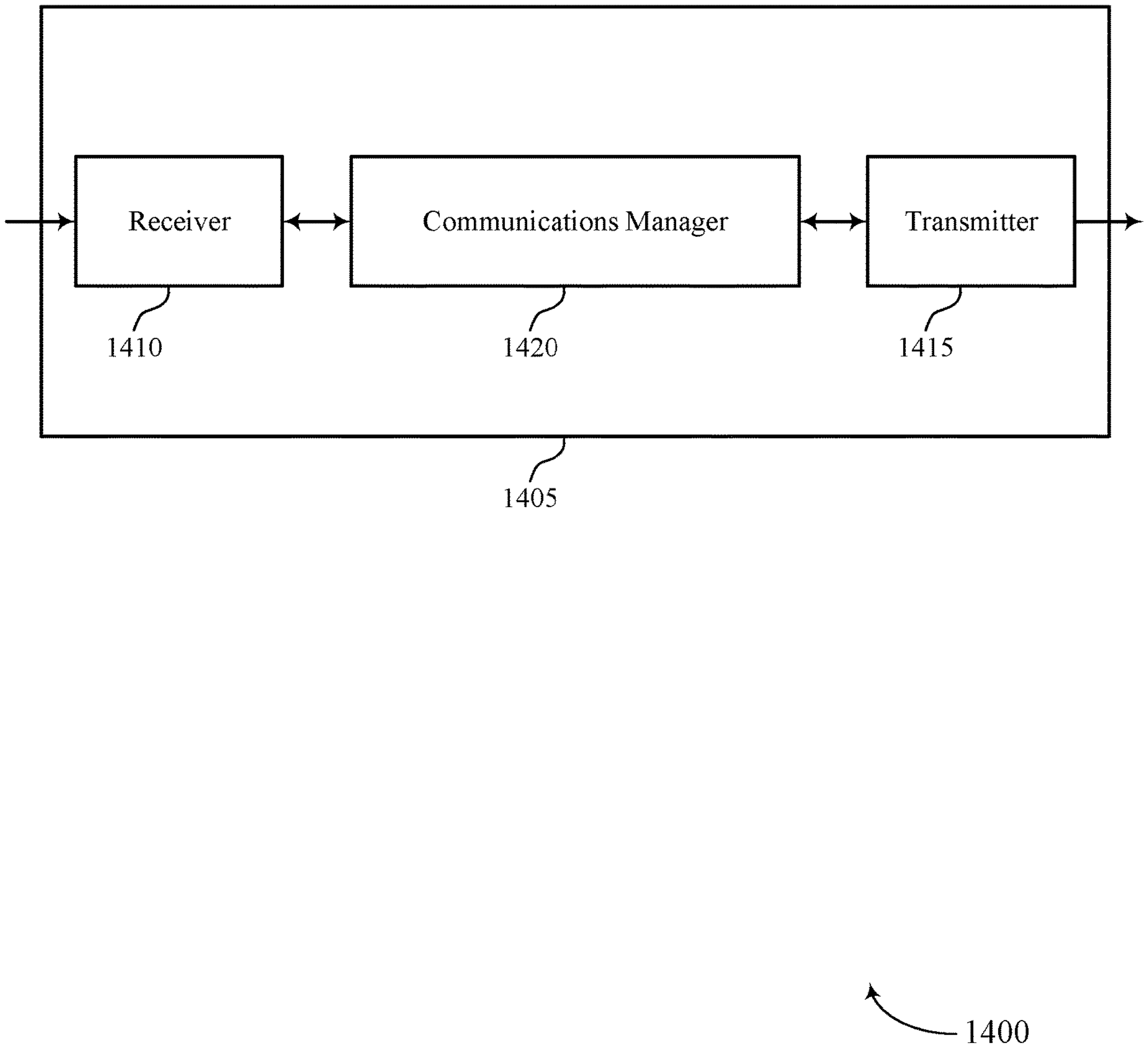
FIGS. 14 and 15 show block diagrams of devices that support monitoring and updating machine learning models in accordance with one or more aspects of the present disclosure.

FIG. 14 shows a block diagram 1400 of a device 1405 that supports monitoring and updating machine learning models in accordance with one or more aspects of the present disclosure. The device 1405 may be an example of aspects of a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of monitoring and updating machine learning models as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a node in accordance with examples as disclosed herein. For example, the communications manager 1420 may be configured as or otherwise support a means for transmitting a control signal indicating an event trigger for reporting a performance parameter associated with a machine learning model. The communications manager 1420 may be configured as or otherwise support a means for transmitting one or more signals indicating input data for monitoring a performance of the machine learning model by a UE. The communications manager 1420 may be configured as or otherwise support a means for receiving a report including the performance parameter, where the performance parameter is based on a comparison between the input data and output data of the machine learning model.

Additionally, or alternatively, the communications manager 1420 may support wireless communication at a node in accordance with examples as disclosed herein. For example, the communications manager 1420 may be configured as or otherwise support a means for receiving a first control signal indicating input data for monitoring a performance of a machine learning model by the node. The communications manager 1420 may be configured as or otherwise support a means for generating a performance parameter associated with the machine learning model based on detecting an event trigger, where the performance parameter is based on a comparison between the input data and output data of the machine learning model. The communications manager 1420 may be configured as or otherwise support a means for transmitting a second control signal configuring a UE with a second machine learning model or activating the second machine learning model based on the performance parameter.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for reduced processing, reduced power consumption, and more efficient utilization of communication resources.

Figure 15:
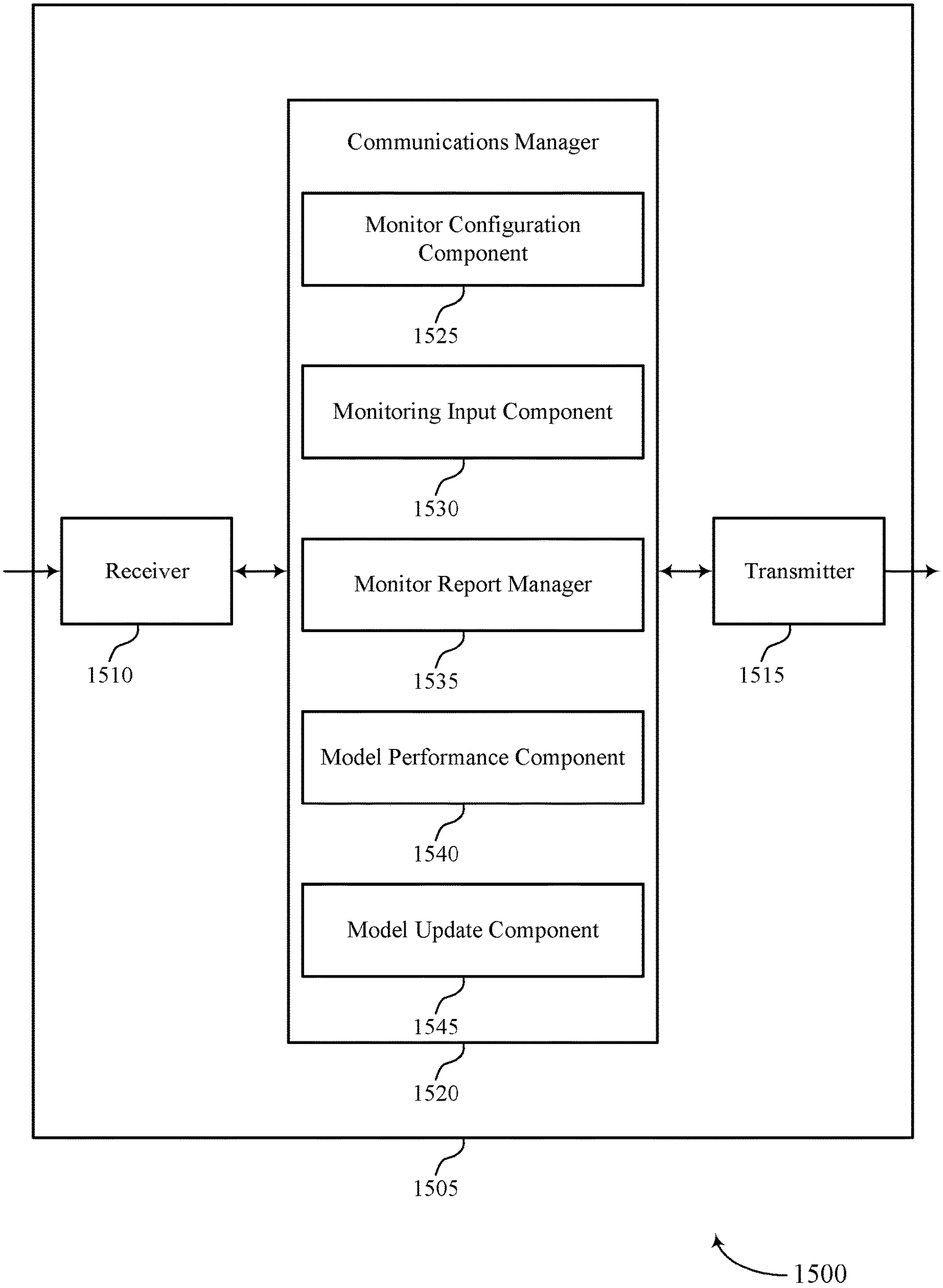

FIG. 15 shows a block diagram 1500 of a device 1505 that supports monitoring and updating machine learning models in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of monitoring and updating machine learning models as described herein. For example, the communications manager 1520 may include a monitor configuration component 1525, a monitoring input component 1530, a monitor report manager 1535, a model performance component 1540, a model update component 1545, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a node in accordance with examples as disclosed herein. The monitor configuration component 1525 may be configured as or otherwise support a means for transmitting a control signal indicating an event trigger for reporting a performance parameter associated with a machine learning model. The monitoring input component 1530 may be configured as or otherwise support a means for transmitting one or more signals indicating input data for monitoring a performance of the machine learning model by a UE. The monitor report manager 1535 may be configured as or otherwise support a means for receiving a report including the performance parameter, where the performance parameter is based on a comparison between the input data and output data of the machine learning model.

Additionally, or alternatively, the communications manager 1520 may support wireless communication at a node in accordance with examples as disclosed herein. The monitoring input component 1530 may be configured as or otherwise support a means for receiving a first control signal indicating input data for monitoring a performance of a machine learning model by the node. The model performance component 1540 may be configured as or otherwise support a means for generating a performance parameter associated with the machine learning model based on detecting an event trigger, where the performance parameter is based on a comparison between the input data and output data of the machine learning model. The model update component 1545 may be configured as or otherwise support a means for transmitting a second control signal configuring a UE with a second machine learning model or activating the second machine learning model based on the performance parameter.

Figure 16:
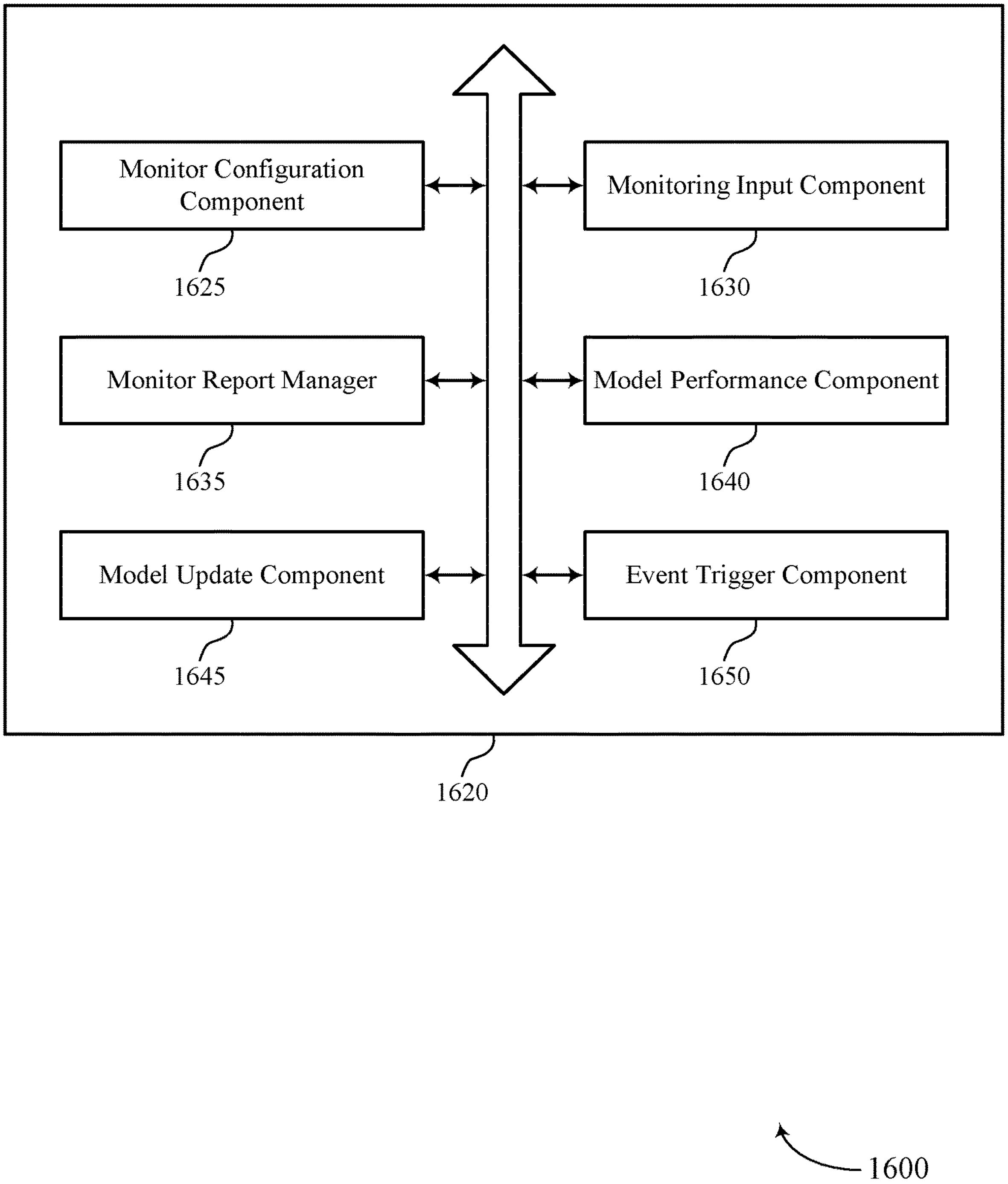
FIG. 16 shows a block diagram of a communications manager that supports monitoring and updating machine learning models in accordance with one or more aspects of the present disclosure.

FIG. 16 shows a block diagram 1600 of a communications manager 1620 that supports monitoring and updating machine learning models in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of monitoring and updating machine learning models as described herein. For example, the communications manager 1620 may include a monitor configuration component 1625, a monitoring input component 1630, a monitor report manager 1635, a model performance component 1640, a model update component 1645, an event trigger component 1650, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communications at a node in accordance with examples as disclosed herein. The monitor configuration component 1625 may be configured as or otherwise support a means for transmitting a control signal indicating an event trigger for reporting a performance parameter associated with a machine learning model. The monitoring input component 1630 may be configured as or otherwise support a means for transmitting one or more signals indicating input data for monitoring a performance of the machine learning model by a UE. The monitor report manager 1635 may be configured as or otherwise support a means for receiving a report including the performance parameter, where the performance parameter is based on a comparison between the input data and output data of the machine learning model.

In some examples, the event trigger includes a change in one or more in one or more communication parameters associated with the node. In some examples, the one or more communication parameters include a number of antennas used for communication between the UE and a node, active component carriers used for communication between the UE and the node, a location of the UE with respect to the node, an orientation of the UE, a velocity of the UE, network slicing, a QoS flow, a session, or a combination thereof.

In some examples, the event trigger includes the performance parameter satisfying a threshold.

In some examples, the monitor report manager 1635 may be configured as or otherwise support a means for transmitting, based on receiving the report, the report to a second node.

In some examples, the model performance component 1640 may be configured as or otherwise support a means for generating a second performance parameter based on detecting the event trigger, where the report further includes the second performance parameter.

In some examples, the monitor configuration component 1625 may be configured as or otherwise support a means for receiving the control signal from a second node, where transmitting the control signal is based on receiving the control signal from the second node.

In some examples, the model update component 1645 may be configured as or otherwise support a means for transmitting a second control signal indicating one or more parameters associated with the machine learning model based on receiving the report.

In some examples, the model update component 1645 may be configured as or otherwise support a means for transmitting a second control signal configuring the UE with a second machine learning model or activating the second machine learning model based on receiving the report.

In some examples, to support transmitting the one or more signals, the monitoring input component 1630 may be configured as or otherwise support a means for transmitting a set of multiple signals according to a periodicity.

In some examples, the input data includes metadata corresponding to evaluating a performance of the machine learning model, ground truth for the machine learning model, one or more thresholds associated with the performance parameter, or a combination thereof.

In some examples, the node includes a network entity, a CU included in the network entity, a distributed unit associated with the network entity, an OAM server, a third party server, a machine learning MR, an NWDAF server, or an RIC.

Additionally, or alternatively, the communications manager 1620 may support wireless communication at a node in accordance with examples as disclosed herein. In some examples, the monitoring input component 1630 may be configured as or otherwise support a means for receiving a first control signal indicating input data for monitoring a performance of a machine learning model by the node. The model performance component 1640 may be configured as or otherwise support a means for generating a performance parameter associated with the machine learning model based on detecting an event trigger, where the performance parameter is based on a comparison between the input data and output data of the machine learning model. The model update component 1645 may be configured as or otherwise support a means for transmitting a second control signal configuring a UE with a second machine learning model or activating the second machine learning model based on the performance parameter.

In some examples, to support detecting the event trigger, the event trigger component 1650 may be configured as or otherwise support a means for detecting a change in one or more communication parameters associated with the node, where the one or more communication parameters include a number of antennas used for communication between the UE and the node, active component carriers used for communication between the UE and the node, a location of the UE with respect to the node, an orientation of the UE, a velocity of the UE, network slicing, a QoS flow, a session, or a combination thereof.

In some examples, to support detecting the event trigger, the event trigger component 1650 may be configured as or otherwise support a means for detecting the performance parameter satisfies a threshold.

In some examples, the monitor configuration component 1625 may be configured as or otherwise support a means for receiving a third control signal indicating the event trigger.

In some examples, the monitor configuration component 1625 may be configured as or otherwise support a means for transmitting a third control signal indicating the event trigger.

Figure 17:
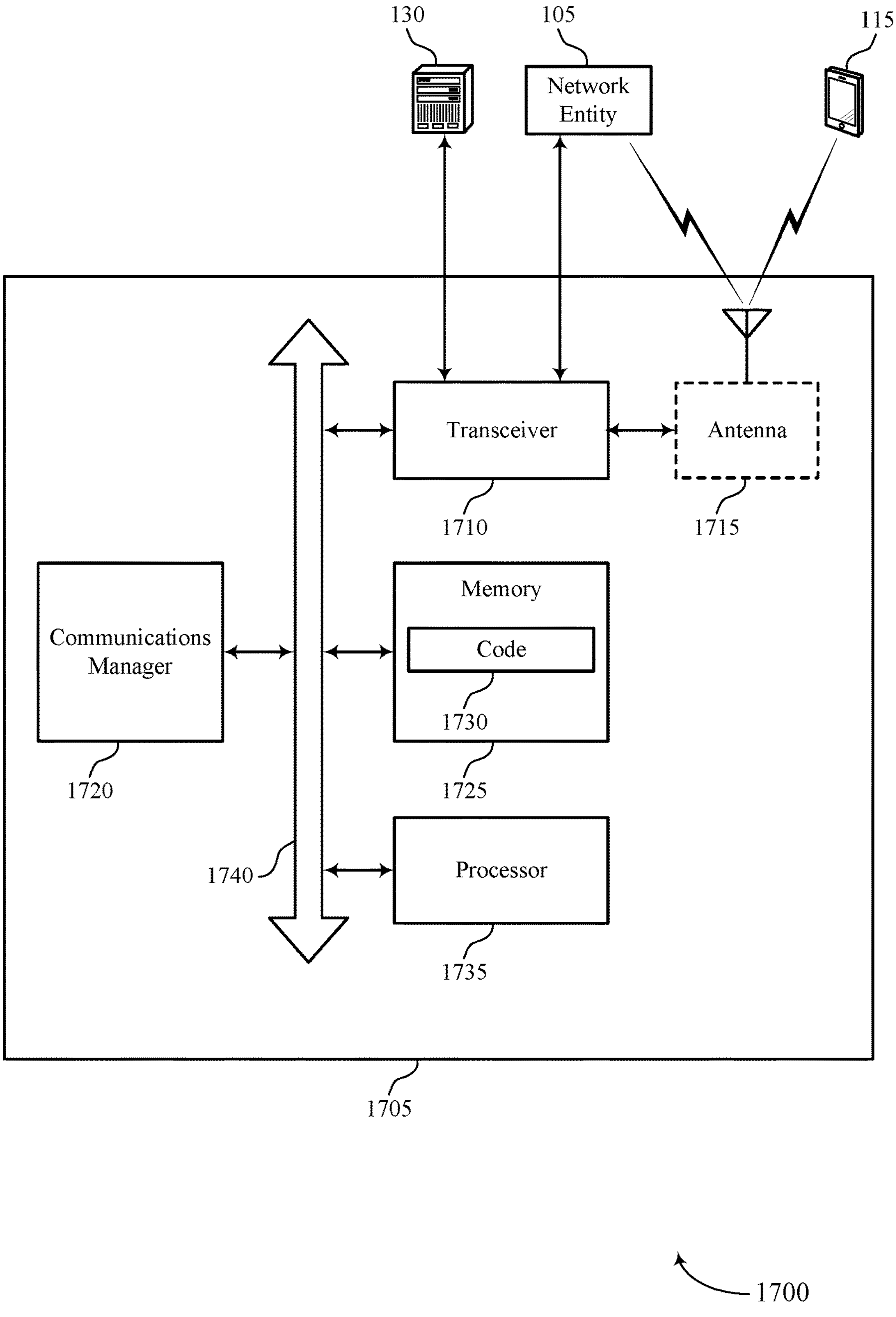
FIG. 17 shows a diagram of a system including a device that supports monitoring and updating machine learning models in accordance with one or more aspects of the present disclosure.

FIG. 17 shows a diagram of a system 1700 including a device 1705 that supports monitoring and updating machine learning models in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or a combination thereof. In some implementations, the transceiver 1710 may include or be configured for coupling with one or more processors or memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or memory components (for example, the processor 1735, or the memory 1725, or both), may be included in a chip or chip assembly that is installed in the device 1705. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting monitoring and updating machine learning models). For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705. The processor 1735 may be any one or more suitable processors capable of executing scripts or instructions of one or more software programs stored in the device 1705 (such as within the memory 1725). In some implementations, the processor 1735 may be a component of a processing system. A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the processor 1735, or the transceiver 1710, or the communications manager 1720, or other components or combinations of components of the device 1705. The processing system of the device 1705 may interface with other components of the device 1705, and may process information received from other components (such as inputs or signals) or output information to other components. For example, a chip or modem of the device 1705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1705 may transmit information output from the chip or modem. Additionally, or alternatively, in some implementations, the one or more interfaces may refer to an interface between the processing system of the chip or modem and a receiver, such that the device 1705 may obtain information or signal inputs, and the information may be passed to the processing system. A person having ordinary skill in the art will readily recognize that a first interface also may obtain information or signal inputs, and a second interface also may output information or signal outputs.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communications at a node in accordance with examples as disclosed herein. For example, the communications manager 1720 may be configured as or otherwise support a means for transmitting a control signal indicating an event trigger for reporting a performance parameter associated with a machine learning model. The communications manager 1720 may be configured as or otherwise support a means for transmitting one or more signals indicating input data for monitoring a performance of the machine learning model by a UE. The communications manager 1720 may be configured as or otherwise support a means for receiving a report including the performance parameter, where the performance parameter is based on a comparison between the input data and output data of the machine learning model.

Additionally, or alternatively, the communications manager 1720 may support wireless communication at a node in accordance with examples as disclosed herein. For example, the communications manager 1720 may be configured as or otherwise support a means for receiving a first control signal indicating input data for monitoring a performance of a machine learning model by the node. The communications manager 1720 may be configured as or otherwise support a means for generating a performance parameter associated with the machine learning model based on detecting an event trigger, where the performance parameter is based on a comparison between the input data and output data of the machine learning model. The communications manager 1720 may be configured as or otherwise support a means for transmitting a second control signal configuring a UE with a second machine learning model or activating the second machine learning model based on the performance parameter.

By including or configuring the communications manager 1720 in accordance with examples as described herein, the device 1705 may support techniques for improved communication reliability, reduced latency, improved user experience related to reduced processing, reduced power consumption, more efficient utilization of communication resources, and improved coordination between devices.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the transceiver 1710, the processor 1735, the memory 1725, the code 1730, or any combination thereof. For example, the code 1730 may include instructions executable by the processor 1735 to cause the device 1705 to perform various aspects of monitoring and updating machine learning models as described herein, or the processor 1735 and the memory 1725 may be otherwise configured to perform or support such operations.

FIG. 18 shows a flowchart illustrating a method 1800 that supports monitoring and updating machine learning models in accordance with one or more aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include receiving a control signal indicating an event trigger for reporting a performance parameter associated with a machine learning model. The operations of 1805 may be performed in accordance with examples as disclosed herein. In some examples, aspects of the operations of 1805 may be performed by a UE monitor configuration component 1225 as described with reference to FIG. 12.

At 1810, the method may include receiving one or more signals indicating input data for monitoring a performance of the machine learning model by the UE. The operations of 1810 may be performed in accordance with examples as disclosed herein. In some examples, aspects of the operations of 1810 may be performed by a UE monitoring input component 1230 as described with reference to FIG. 12.

At 1815, the method may include transmitting a report including the performance parameter based on detecting the event trigger, where the performance parameter is based on monitoring the performance of the machine learning model and on a comparison between the input data and output data of the machine learning model. The operations of 1815 may be performed in accordance with examples as disclosed herein. In some examples, aspects of the operations of 1815 may be performed by a UE monitor report transmitter 1235 as described with reference to FIG. 12.

FIG. 19 shows a flowchart illustrating a method 1900 that supports monitoring and updating machine learning models in accordance with one or more aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1905, the method may include receiving a control signal indicating an event trigger for reporting a performance parameter associated with a machine learning model. The operations of 1905 may be performed in accordance with examples as disclosed herein. In some examples, aspects of the operations of 1905 may be performed by a UE monitor configuration component 1225 as described with reference to FIG. 12.

At 1910, the method may include receiving one or more signals indicating input data for monitoring a performance of the machine learning model by the UE. The operations of 1910 may be performed in accordance with examples as disclosed herein. In some examples, aspects of the operations of 1910 may be performed by a UE monitoring input component 1230 as described with reference to FIG. 12.

At 1915, the method may include transmitting a report including the performance parameter based on detecting the event trigger, where the performance parameter is based on monitoring the performance of the machine learning model and on a comparison between the input data and output data of the machine learning model. The operations of 1915 may be performed in accordance with examples as disclosed herein. In some examples, aspects of the operations of 1915 may be performed by a UE monitor report transmitter 1235 as described with reference to FIG. 12.

At 1920, the method may include receiving a second control signal indicating one or more parameters associated with the machine learning model based on transmitting the report. The operations of 1920 may be performed in accordance with examples as disclosed herein. In some examples, aspects of the operations of 1920 may be performed by a UE model update component 1245 as described with reference to FIG. 12.

At 1925, the method may include updating the machine learning model based on the one or more parameters associated with the machine learning model. The operations of 1925 may be performed in accordance with examples as disclosed herein. In some examples, aspects of the operations of 1925 may be performed by a UE model update component 1245 as described with reference to FIG. 12.

FIG. 20 shows a flowchart illustrating a method 2000 that supports monitoring and updating machine learning models in accordance with one or more aspects of the present disclosure. The operations of the method 2000 may be implemented by a network entity or its components as described herein. For example, the operations of the method 2000 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2005, the method may include transmitting a control signal indicating an event trigger for reporting a performance parameter associated with a machine learning model. The operations of 2005 may be performed in accordance with examples as disclosed herein. In some examples, aspects of the operations of 2005 may be performed by a monitor configuration component 1625 as described with reference to FIG. 16.

At 2010, the method may include transmitting one or more signals indicating input data for monitoring a performance of the machine learning model by a UE. The operations of 2010 may be performed in accordance with examples as disclosed herein. In some examples, aspects of the operations of 2010 may be performed by a monitoring input component 1630 as described with reference to FIG. 16.

At 2015, the method may include receiving a report including the performance parameter, where the performance parameter is based on a comparison between the input data and output data of the machine learning model. The operations of 2015 may be performed in accordance with examples as disclosed herein. In some examples, aspects of the operations of 2015 may be performed by a monitor report manager 1635 as described with reference to FIG. 16.

FIG. 21 shows a flowchart illustrating a method 2100 that supports monitoring and updating machine learning models in accordance with one or more aspects of the present disclosure. The operations of the method 2100 may be implemented by a network entity or its components as described herein. For example, the operations of the method 2100 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2105, the method may include transmitting a control signal indicating an event trigger for reporting a performance parameter associated with a machine learning model. The operations of 2105 may be performed in accordance with examples as disclosed herein. In some examples, aspects of the operations of 2105 may be performed by a monitor configuration component 1625 as described with reference to FIG. 16.

At 2110, the method may include transmitting one or more signals indicating input data for monitoring a performance of the machine learning model by a UE. The operations of 2110 may be performed in accordance with examples as disclosed herein. In some examples, aspects of the operations of 2110 may be performed by a monitoring input component 1630 as described with reference to FIG. 16.

At 2115, the method may include receiving a report including the performance parameter, where the performance parameter is based on a comparison between the input data and output data of the machine learning model. The operations of 2115 may be performed in accordance with examples as disclosed herein. In some examples, aspects of the operations of 2115 may be performed by a monitor report manager 1635 as described with reference to FIG. 16.

At 2120, the method may include transmitting a second control signal indicating one or more parameters associated with the machine learning model based on receiving the report. The operations of 2120 may be performed in accordance with examples as disclosed herein. In some examples, aspects of the operations of 2120 may be performed by a model update component 1645 as described with reference to FIG. 16.

FIG. 22 shows a flowchart illustrating a method 2200 that supports monitoring and updating machine learning models in accordance with one or more aspects of the present disclosure. The operations of the method 2200 may be implemented by a network entity or its components as described herein. For example, the operations of the method 2200 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2205, the method may include receiving a first control signal indicating input data for monitoring a performance of a machine learning model by the node. The operations of 2205 may be performed in accordance with examples as disclosed herein. In some examples, aspects of the operations of 2205 may be performed by a monitoring input component 1630 as described with reference to FIG. 16.

At 2210, the method may include generating a performance parameter associated with the machine learning model based on detecting an event trigger, where the performance parameter is based on a comparison between the input data and output data of the machine learning model. The operations of 2210 may be performed in accordance with examples as disclosed herein. In some examples, aspects of the operations of 2210 may be performed by a model performance component 1640 as described with reference to FIG. 16.

At 2215, the method may include transmitting a second control signal configuring a UE with a second machine learning model or activating the second machine learning model based on the performance parameter. The operations of 2215 may be performed in accordance with examples as disclosed herein. In some examples, aspects of the operations of 2215 may be performed by a model update component 1645 as described with reference to FIG. 16.

Figure 23:
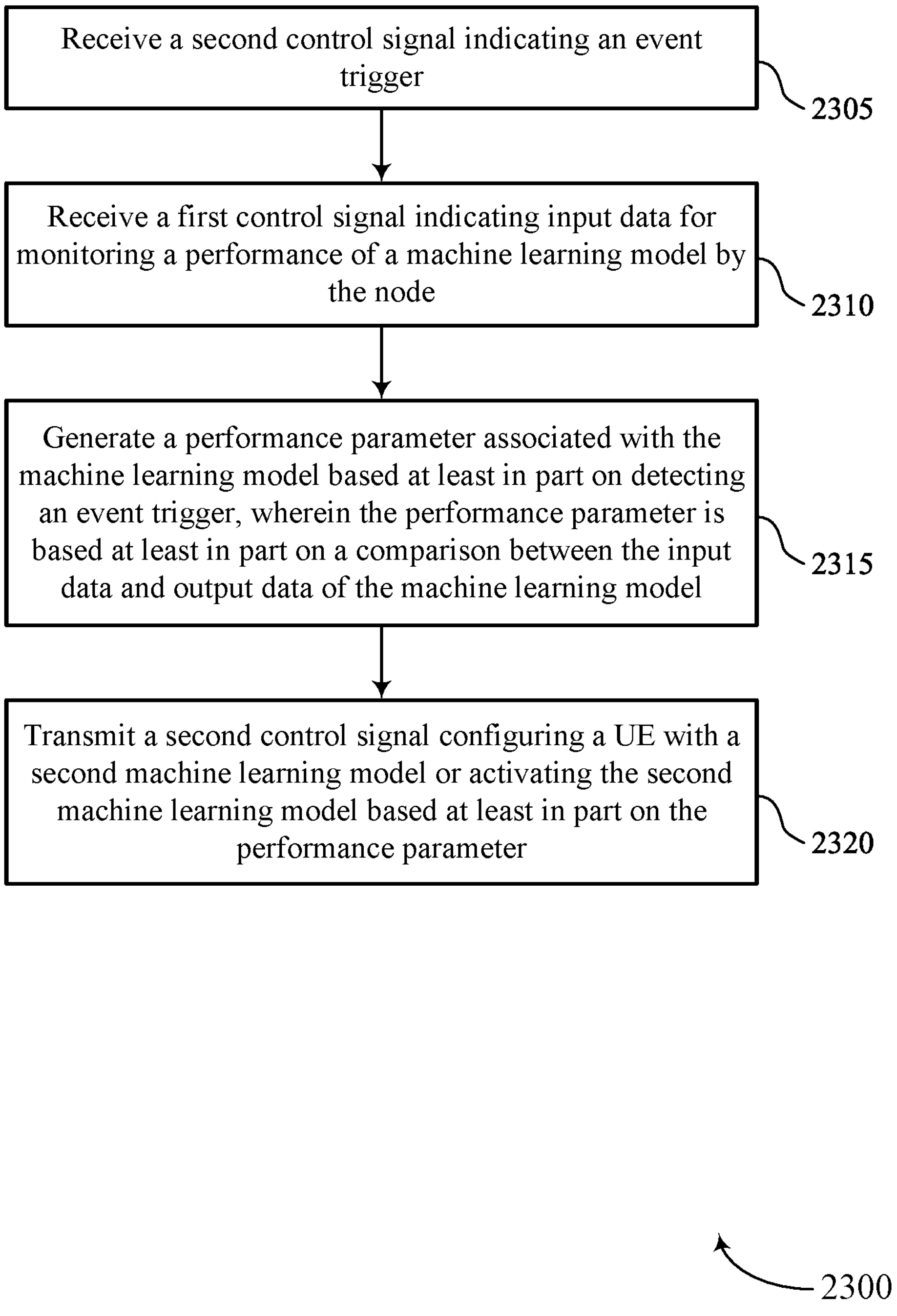

FIG. 23 shows a flowchart illustrating a method 2300 that supports monitoring and updating machine learning models in accordance with one or more aspects of the present disclosure. The operations of the method 2300 may be implemented by a network entity or its components as described herein. For example, the operations of the method 2300 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2305, the method may include receiving a second control signal indicating an event trigger. The operations of 2305 may be performed in accordance with examples as disclosed herein. In some examples, aspects of the operations of 2305 may be performed by a monitor configuration component 1625 as described with reference to FIG. 16.

At 2310, the method may include receiving a first control signal indicating input data for monitoring a performance of a machine learning model by the node. The operations of 2310 may be performed in accordance with examples as disclosed herein. In some examples, aspects of the operations of 2310 may be performed by a monitoring input component 1630 as described with reference to FIG. 16.

At 2315, the method may include generating a performance parameter associated with the machine learning model based on detecting an event trigger, where the performance parameter is based on a comparison between the input data and output data of the machine learning model. The operations of 2315 may be performed in accordance with examples as disclosed herein. In some examples, aspects of the operations of 2315 may be performed by a model performance component 1640 as described with reference to FIG. 16.

At 2320, the method may include transmitting a second control signal configuring a UE with a second machine learning model or activating the second machine learning model based on the performance parameter. The operations of 2320 may be performed in accordance with examples as disclosed herein. In some examples, aspects of the operations of 2320 may be performed by a model update component 1645 as described with reference to FIG. 16.

The following provides an overview of aspects of the present disclosure:

Aspect 1: A method for wireless communications at a UE, comprising: receiving a control signal indicating an event trigger for reporting a performance parameter associated with a machine learning model; receiving one or more signals indicating input data for monitoring a performance of the machine learning model by the UE; and transmitting a report comprising the performance parameter based at least in part on detecting the event trigger, wherein the performance parameter is based at least in part on monitoring the performance of the machine learning model and on a comparison between the input data and output data of the machine learning model.

Aspect 2: The method of aspect 1, wherein detecting the event trigger comprises: detecting a change in one or more communication parameters associated with the UE, wherein the one or more communication parameters comprise a number of antennas used for communication between the UE and a node, active component carriers used for communication between the UE and the node, a location of the UE with respect to the node, an orientation of the UE, a velocity of the UE, network slicing, a QoS flow, a session, or a combination thereof.

Aspect 3: The method of any of aspects 1 through 2, wherein detecting the event trigger comprises: detecting the performance parameter satisfies a threshold.

Aspect 4: The method of any of aspects 1 through 3, further comprising: receiving a second control signal indicating one or more parameters associated with the machine learning model based at least in part on transmitting the report; and updating the machine learning model based at least in part on the one or more parameters associated with the machine learning model.

Aspect 5: The method of any of aspects 1 through 3, further comprising: receiving a second control signal configuring the UE with a second machine learning model or activating the second machine learning model based at least in part on transmitting the report; and implementing the second machine learning model to perform one or more wireless communication procedures based at in part the second control signal.

Aspect 6: The method of any of aspects 1 through 5, further comprising: transmitting a second control signal indicating that the UE successfully received and implemented the control signal, wherein receiving the one or more signals is based at least in part on transmitting the second control signal.

Aspect 7: The method of any of aspects 1 through 6, wherein receiving the one or more signals comprises: receiving a plurality of signals according to a periodicity.

Aspect 8: The method of any of aspects 1 through 7, wherein the input data comprises meta-data corresponding to evaluating the performance of the machine learning model, ground truth for the machine learning model, one or more thresholds associated with the performance parameter, or a combination thereof.

Aspect 9: The method of any of aspects 1 through 8, wherein the performance parameter comprises a system KPI or an interference KPI.

Aspect 10: The method of any of aspects 1 through 9, wherein the report further comprises input data and the output data of the machine learning model.

Aspect 11: A method for wireless communications at a node, comprising: transmitting a control signal indicating an event trigger for reporting a performance parameter associated with a machine learning model; transmitting one or more signals indicating input data for monitoring a performance of the machine learning model by a UE; and receiving a report comprising the performance parameter, wherein the performance parameter is based at least in part on a comparison between the input data and output data of the machine learning model.

Aspect 12: The method of aspect 11, wherein the event trigger comprises a change in one or more in one or more communication parameters associated with the node, the one or more communication parameters comprise a number of antennas used for communication between the UE and a node, active component carriers used for communication between the UE and the node, a location of the UE with respect to the node, an orientation of the UE, a velocity of the UE, network slicing, a QoS flow, a session, or a combination thereof.

Aspect 13: The method of any of aspects 11 through 12, wherein the event trigger comprises the performance parameter satisfying a threshold.

Aspect 14: The method of any of aspects 11 through 13, further comprising: transmitting, based at least in part on receiving the report, the report to a second node.

Aspect 15: The method of aspect 14, further comprising: generating a second performance parameter based at least in part on detecting the event trigger, wherein the report further comprises the second performance parameter.

Aspect 16: The method of any of aspects 11 through 15, further comprising: receiving the control signal from a second node, wherein transmitting the control signal is based at least in part on receiving the control signal from the second node.

Aspect 17: The method of any of aspects 11 through 16, further comprising: transmitting a second control signal indicating one or more parameters associated with the machine learning model based at least in part on receiving the report.

Aspect 18: The method of any of aspects 11 through 16, further comprising: transmitting a second control signal configuring the UE with a second machine learning model or activating the second machine learning model based at least in part on receiving the report.

Aspect 19: The method of any of aspects 11 through 18, wherein transmitting the one or more signals comprises: transmitting a plurality of signals according to a periodicity.

Aspect 20: The method of any of aspects 11 through 19, wherein the input data comprises meta-data corresponding to evaluating a performance of the machine learning model, ground truth for the machine learning model, one or more thresholds associated with the performance parameter, or a combination thereof.

Aspect 21: The method of any of aspects 11 through 20, wherein the node comprises a network entity, a CU included in the network entity, a DU associated with the network entity, an OAM server, a third party server, a machine learning MR, a NWDAF server, or an RIC.

Aspect 22: A method for wireless communication at a node, comprising: receiving a first control signal indicating input data for monitoring a performance of a machine learning model by the node; generating a performance parameter associated with the machine learning model based at least in part on detecting an event trigger, wherein the performance parameter is based at least in part on a comparison between the input data and output data of the machine learning model; and transmitting a second control signal configuring a UE with a second machine learning model or activating the second machine learning model based at least in part on the performance parameter.

Aspect 23: The method of aspect 22, wherein detecting the event trigger comprises: detecting a change in one or more communication parameters associated with the node, wherein the one or more communication parameters comprise a number of antennas used for communication between the UE and the node, active component carriers used for communication between the UE and the node, a location of the UE with respect to the node, an orientation of the UE, a velocity of the UE, network slicing, a QoS flow, a session, or a combination thereof.

Aspect 24: The method of any of aspects 22 through 23, wherein detecting the event trigger comprises: detecting the performance parameter satisfies a threshold.

Aspect 25: The method of any of aspects 22 through 24, further comprising: receiving a third control signal indicating the event trigger.

Aspect 26: The method of any of aspects 22 through 25, further comprising: transmitting a third control signal indicating the event trigger.

Aspect 27: An apparatus for wireless communications at a UE, comprising a processor; memory coupled with the processor; and instructions stored in the memory and executable by the processor to cause the apparatus to perform a method of any of aspects 1 through 10.

Aspect 28: An apparatus for wireless communications at a UE, comprising at least one means for performing a method of any of aspects 1 through 10.

Aspect 29: A non-transitory computer-readable medium storing code for wireless communications at a UE, the code comprising instructions executable by a processor to perform a method of any of aspects 1 through 10.

Aspect 30: An apparatus for wireless communications at a node, comprising a processor; memory coupled with the processor; and instructions stored in the memory and executable by the processor to cause the apparatus to perform a method of any of aspects 11 through 21.

Aspect 31: An apparatus for wireless communications at a node, comprising at least one means for performing a method of any of aspects 11 through 21.

Aspect 32: A non-transitory computer-readable medium storing code for wireless communications at a node, the code comprising instructions executable by a processor to perform a method of any of aspects 11 through 21.

Aspect 33: An apparatus for wireless communication at a node, comprising a processor; memory coupled with the processor; and instructions stored in the memory and executable by the processor to cause the apparatus to perform a method of any of aspects 22 through 26.

Aspect 34: An apparatus for wireless communication at a node, comprising at least one means for performing a method of any of aspects 22 through 26.

Aspect 35: A non-transitory computer-readable medium storing code for wireless communication at a node, the code comprising instructions executable by a processor to perform a method of any of aspects 22 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
- receiving a control signal indicating a configuration for reporting a performance parameter associated with a machine learning model that is implemented at the UE;
- receiving one or more signals indicating input data for monitoring, by the UE, a performance of the machine learning model that is implemented at the UE; and
- transmitting a report comprising the performance parameter, wherein the performance parameter is based at least in part on monitoring the performance of the machine learning model and on a comparison between the input data and output data of the machine learning model.

2. The method of claim 1, wherein transmitting the report comprises:
- transmitting the report based at least in part on detecting an event trigger, wherein the event trigger comprises a change in one or more communication parameters associated with the UE, wherein the one or more communication parameters comprise a number of antennas used for communication between the UE and a node, active component carriers used for communication between the UE and the node, a location of the UE with respect to the node, an orientation of the UE, a velocity of the UE, network slicing, a quality of service flow, a session, or a combination thereof.

3. The method of claim 1, wherein transmitting the report comprises:
- transmitting the report based at least in part on detecting an event trigger, wherein the event trigger comprises detecting that the performance parameter satisfies a threshold.

4. The method of claim 1, further comprising:
- receiving a second control signal indicating one or more parameters associated with the machine learning model based at least in part on transmitting the report; and
- updating the machine learning model based at least in part on the one or more parameters associated with the machine learning model.

5. The method of claim 1, further comprising:
- receiving a second control signal configuring the UE with a second machine learning model or activating the second machine learning model based at least in part on transmitting the report; and
- implementing the second machine learning model to perform one or more wireless communication procedures based at least in part the second control signal.

6. The method of claim 1, further comprising:
- transmitting a second control signal indicating that the UE successfully received and implemented the control signal, wherein receiving the one or more signals is based at least in part on transmitting the second control signal.

7. The method of claim 1, wherein receiving the one or more signals comprises:
- receiving a plurality of signals according to a periodicity.

8. The method of claim 1, wherein the input data comprises metadata corresponding to evaluating the performance of the machine learning model, ground truth for the machine learning model, one or more thresholds associated with the performance parameter, or a combination thereof.

9. The method of claim 1, wherein the performance parameter comprises a system key performance indicator or an interference key performance indicator.

10. The method of claim 1, wherein the report further comprises the input data and the output data of the machine learning model.

11. A method for wireless communications at a node, comprising:
- transmitting a control signal indicating a configuration for reporting a performance parameter associated with a machine learning model that is for implementation at a UE;
- transmitting one or more signals indicating input data for monitoring, by the UE, of a performance of the machine learning model that is for implementation at the UE; and
- receiving a report comprising the performance parameter, wherein the performance parameter is based at least in part on a comparison between the input data and output data of the machine learning model.

12. The method of claim 11, wherein transmitting the control signal indicating the configuration is based at least in part on an event trigger that comprises a change in one or more in one or more communication parameters associated with the node, the one or more communication parameters comprise a number of antennas used for communication between the UE and the node, active component carriers used for communication between the UE and the node, a location of the UE with respect to the node, an orientation of the UE, a velocity of the UE, network slicing, a quality of service flow, a session, or a combination thereof.

13. The method of claim 11, wherein transmitting the control signal indicating the configuration is based at least in part on an event trigger that comprises the performance parameter satisfying a threshold.

14. The method of claim 11, further comprising:
- transmitting, based at least in part on receiving the report, the report to a second node.

15. The method of claim 14, further comprising:
generating a second performance parameter based at least in part on detecting an event trigger, wherein the report further comprises the second performance parameter.

16. The method of claim 11, further comprising:
receiving the control signal from a second node, wherein transmitting the control signal is based at least in part on receiving the control signal from the second node.

17. The method of claim 11, further comprising:
transmitting a second control signal indicating one or more parameters associated with the machine learning model based at least in part on receiving the report.

18. The method of claim 11, further comprising:
transmitting a second control signal configuring the UE with a second machine learning model or activating the second machine learning model based at least in part on receiving the report.

19. The method of claim 11, wherein transmitting the one or more signals comprises:
transmitting a plurality of signals according to a periodicity.

20. The method of claim 1, wherein implementing the machine learning model at the UE comprises using the input data and the machine learning model to generate the output data of the machine learning model at the UE.

21. The method of claim 11, wherein the node comprises a network entity, a central unit included in the network entity, a distributed unit associated with the network entity, an operations, administration, and maintenance server, a third party server, a machine learning model repository, a network data analytics function server, or a random access network intelligent controller.

22. A method for wireless communication at a node, comprising:
receiving a first control signal indicating input data for monitoring, by the node, a performance of a machine learning model that is for implementation at a user equipment (UE);
generating a performance parameter associated with the machine learning model based at least in part on detecting an event trigger, wherein the performance parameter is based at least in part on a comparison between the input data and output data of the machine learning model; and
transmitting a second control signal configuring the UE with a second machine learning model that is for implementation at the UE or activating the second machine learning model that is for implementation at the UE based at least in part on the performance parameter.

23. The method of claim 22, wherein detecting the event trigger comprises:
detecting a change in one or more communication parameters associated with the node, wherein the one or more communication parameters comprise a number of antennas used for communication between the UE and the node, active component carriers used for communication between the UE and the node, a location of the UE with respect to the node, an orientation of the UE, a velocity of the UE, network slicing, a quality of service flow, a session, or a combination thereof.

24. The method of claim 22, wherein detecting the event trigger comprises:
detecting the performance parameter satisfies a threshold.

25. The method of claim 22, further comprising:
receiving a third control signal indicating the event trigger.

26. The method of claim 22, further comprising:
transmitting a third control signal indicating the event trigger.

27. An apparatus for wireless communications at a user equipment (UE), comprising:
a processor;
memory coupled with the processor; and
instructions stored in the memory and executable by the processor to cause the apparatus to:
receive a control signal indicating a configuration for reporting a performance parameter associated with a machine learning model that is implemented at the UE;
receive one or more signals indicating input data for monitoring, by the UE, a performance of the machine learning model by the UE; and
transmit a report comprising the performance parameter, wherein the performance parameter is based at least in part on monitoring the performance of the machine learning model and on a comparison between the input data and output data of the machine learning model.

28. The apparatus of claim 27, wherein the instructions to transmit the report are executable by the processor to cause the apparatus to:
transmit the report based at least in part on detecting an event trigger, wherein the event trigger comprises a change in one or more communication parameters associated with the UE, wherein the one or more communication parameters comprise a number of antennas used for communication between the UE and a node, active component carriers used for communication between the UE and the node, a location of the UE with respect to the node, an orientation of the UE, a velocity of the UE, network slicing, a quality of service flow, a session, or a combination thereof.

29. The apparatus of claim 27, wherein the instructions to transmit the report are executable by the processor to cause the apparatus to:
transmit the report based at least in part on detecting an event trigger, wherein the event trigger comprises detecting that the performance parameter satisfies a threshold.

30. The apparatus of claim 27, wherein the instructions are further executable by the processor to cause the apparatus to:
receive a second control signal indicating one or more parameters associated with the machine learning model based at least in part on transmitting the report; and
update the machine learning model based at least in part on the one or more parameters associated with the machine learning model.

* * * * *